United States Patent
Crook et al.

(10) Patent No.: US 6,622,744 B2
(45) Date of Patent: Sep. 23, 2003

(54) FILLING POD FOR A BATTERY, VEHICLE AND METHOD OF SUPPLYING FLUID TO A BATTERY

(75) Inventors: Randal L. Crook, Evans, GA (US); Daniel T. Aron, McCormick, SC (US); Michael A. Vassily, Martinez, GA (US); James R. Kerlin, Martinez, GA (US); Gerald C. Skelton, Martinez, GA (US)

(73) Assignee: Club Car, Inc., Augusta, GA (US)

( * ) Notice: Subject to any disclaimer, the term of this patent is extended or adjusted under 35 U.S.C. 154(b) by 315 days.

(21) Appl. No.: 09/829,766

(22) Filed: Apr. 10, 2001

(65) Prior Publication Data

US 2001/0027810 A1 Oct. 11, 2001

Related U.S. Application Data

(63) Continuation-in-part of application No. 09/545,939, filed on Apr. 10, 2000, now Pat. No. 6,213,145.

(51) Int. Cl.[7] ................................................ H01M 2/36
(52) U.S. Cl. .......................... 137/1; 137/260; 429/63; 429/73; 429/74
(58) Field of Search ...................... 137/260, 1; 429/63, 429/64, 74, 72, 73

(56) References Cited

U.S. PATENT DOCUMENTS

| | | | |
|---|---|---|---|
| 539,689 A | 5/1895 | Knispel | |
| 1,165,100 A | 12/1915 | Holland | |
| 1,275,261 A | 8/1918 | Hutchinson | |
| 1,765,433 A | 6/1930 | Lavett | |
| 1,791,152 A | 2/1931 | Van Meter, Jr. | |
| 1,869,258 A | 7/1932 | Holland | |
| 1,878,223 A | 9/1932 | Woodbridge | |
| 1,938,989 A | 12/1933 | Woodbridge | |
| 1,942,908 A | * 1/1934 | Swain et al. | ................. 137/260 |
| 2,141,621 A | 12/1938 | Setzer | |
| 2,220,005 A | 10/1940 | Smith | |
| 2,532,520 A | 12/1950 | Simpson | |
| 3,483,042 A | 12/1969 | Hulse | |
| 3,542,598 A | 11/1970 | White et al. | |
| 3,561,505 A | * 2/1971 | Ryder | ..................... 137/260 X |
| 3,630,788 A | 12/1971 | Hennen | |
| 3,772,087 A | 11/1973 | Schmechtig | |
| 3,861,965 A | 1/1975 | O'Sullivan | |
| 4,007,764 A | 2/1977 | Bandemor | |

(List continued on next page.)

FOREIGN PATENT DOCUMENTS

WO    WO 98/40653    9/1998

*Primary Examiner*—Kevin Lee
(74) *Attorney, Agent, or Firm*—Michael Best & Friedrich LLP

(57) ABSTRACT

A filling pod, a vehicle and a method for supplying fluid to a battery. The filling pod includes a filling pod housing having a filling pod port fluidly connectable to a fluid source for receiving fluid from the fluid source, a first fluid supply member fluidly connectable to a first cell and for supplying fluid from the filling pod port to the first cell, a second fluid supply member fluidly connectable to a second cell and for supplying fluid from the filling pod port and to the second cell, and an integral channel in fluid communication between the filling pod port, the first fluid supply member and the second fluid supply member. The channel includes a first channel portion in fluid communication between the filling pod port and the first fluid supply member and a second channel portion in fluid communication between the filling pod port and the second fluid supply member. When fluid is supplied to the filling pod through the filling pod port, a first amount of fluid flows through the first channel portion to the first fluid supply member and to the first cell, and a second amount of fluid flows through the second channel portion to the second fluid supply member and to the second cell.

81 Claims, 11 Drawing Sheets

U.S. PATENT DOCUMENTS

| | | |
|---|---|---|
| 4,079,761 A | 3/1978 | Herbst, Sr. |
| 4,113,925 A | 9/1978 | Kohler et al. |
| 4,278,742 A | 7/1981 | Oxenreider et al. |
| 4,289,176 A | 9/1981 | Evans |
| 4,353,968 A | 10/1982 | Boyle |
| 4,386,141 A | 5/1983 | Weidner et al. |
| 4,424,263 A | 1/1984 | Howell et al. |
| 4,497,880 A | 2/1985 | Kraft et al. |
| 4,522,896 A | 6/1985 | Iseard |
| 4,527,593 A | 7/1985 | Campau |
| 4,749,633 A | 6/1988 | Elias |
| 4,754,777 A | 7/1988 | Frode |
| 4,765,359 A | 8/1988 | Burnett |
| 5,002,100 A | 3/1991 | Frederick |
| 5,048,557 A | 9/1991 | Campau |
| 5,090,442 A | 2/1992 | Campau |
| 5,128,600 A | 7/1992 | Lim |
| 5,284,176 A | 2/1994 | Campau |
| 5,422,199 A | 6/1995 | Adams et al. |
| 5,453,334 A | 9/1995 | Melichar |
| 5,543,243 A | 8/1996 | Brecht |
| 5,832,946 A | 11/1998 | Campau |
| 5,853,913 A | 12/1998 | Stocchiero |
| 5,862,830 A | 1/1999 | Landau |
| 5,902,694 A | 5/1999 | Landau |
| 5,914,201 A | 6/1999 | Hughett et al. |
| 6,164,309 A | 12/2000 | Brecht |
| 6,213,145 B1 * | 4/2001 | Crook et al. ............... 137/260 |
| 6,228,525 B1 | 5/2001 | Hassell |
| 6,338,368 B1 | 1/2002 | Hassell |

* cited by examiner

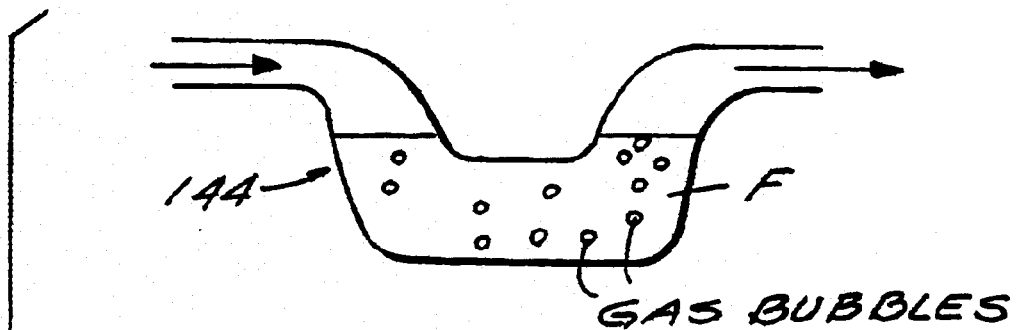
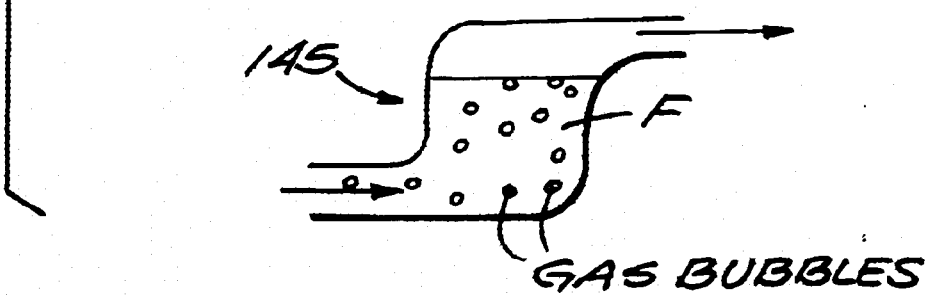
Fig. 9

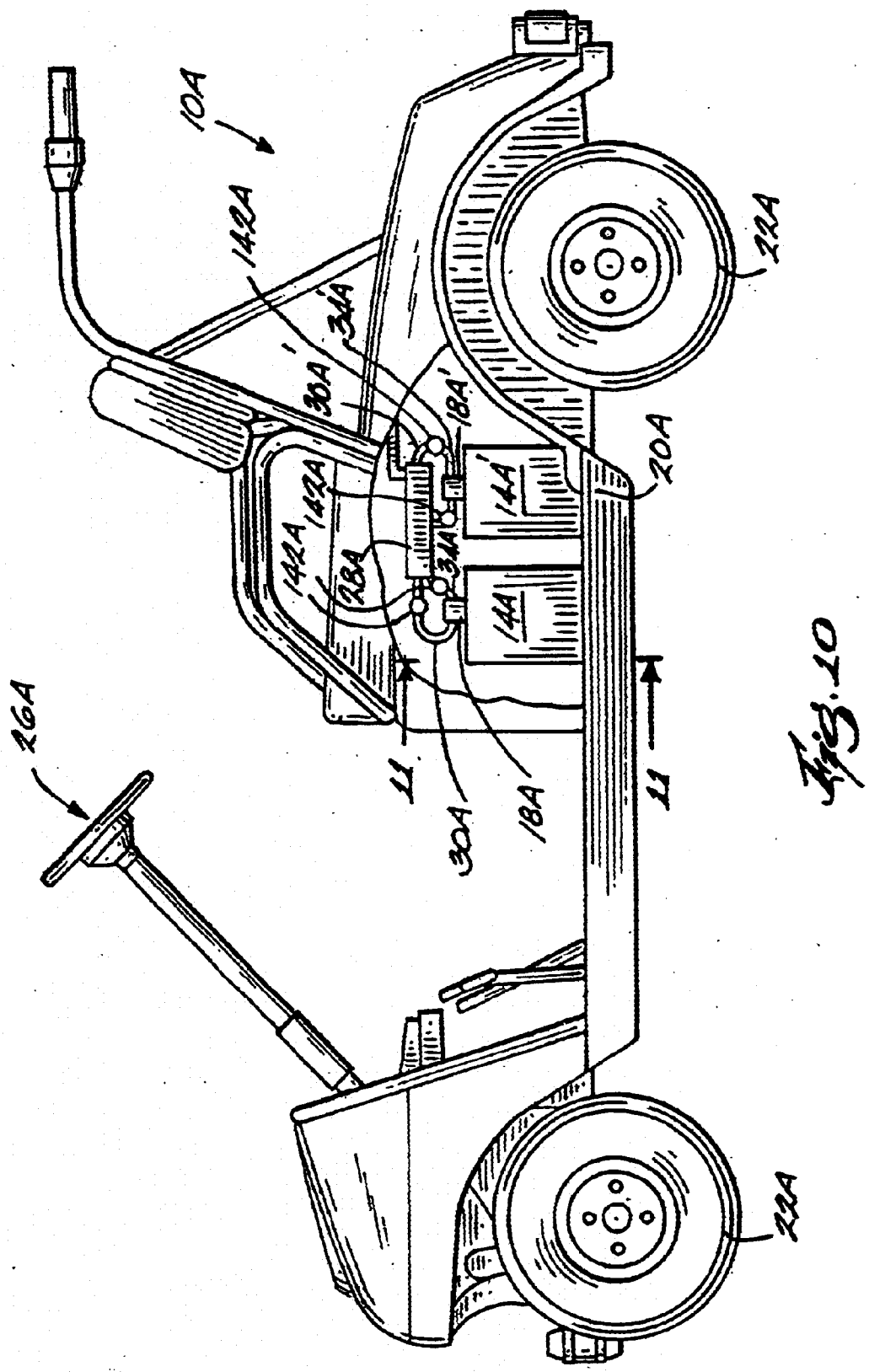

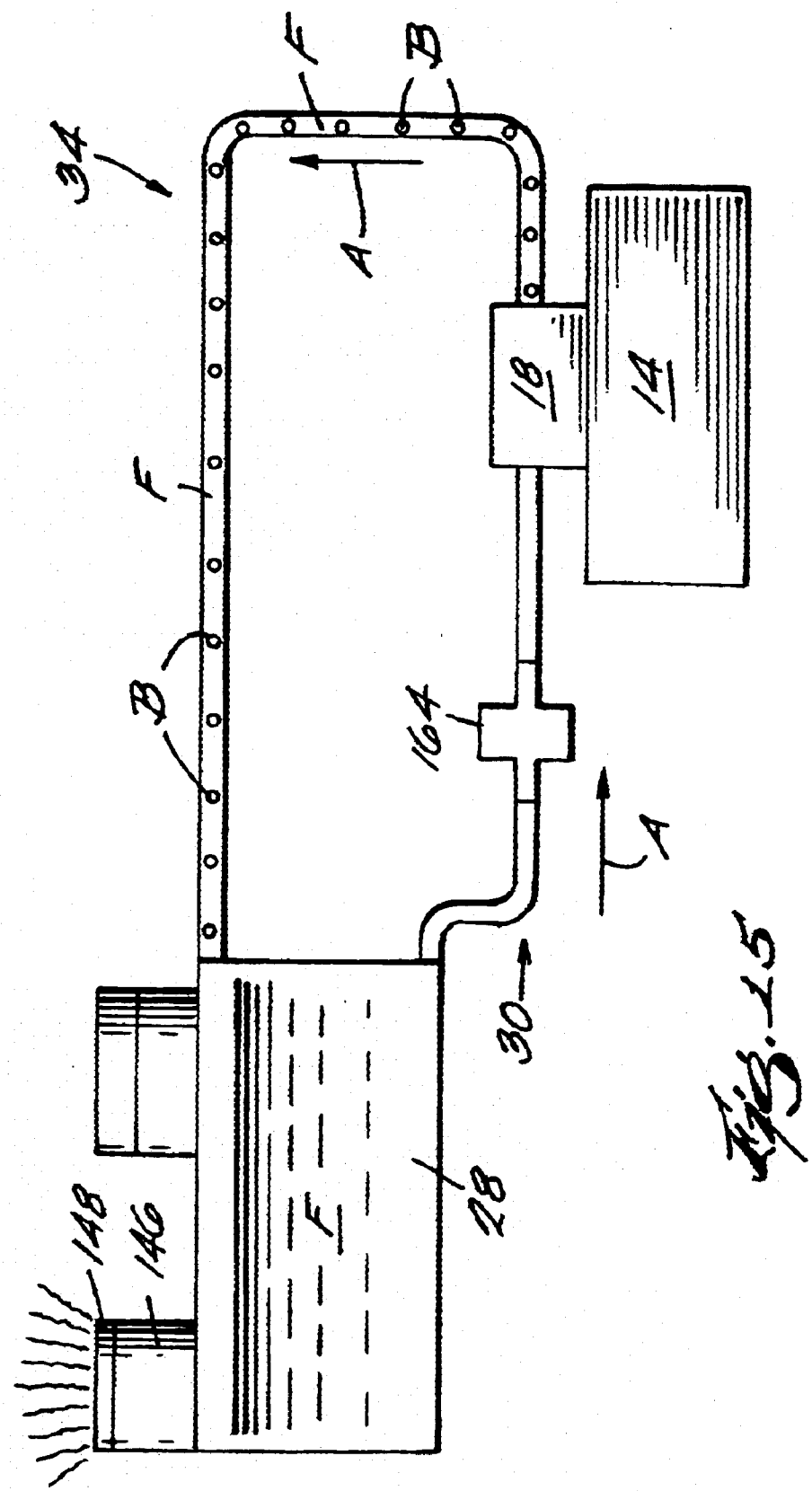

FILLING POD FOR A BATTERY, VEHICLE AND METHOD OF SUPPLYING FLUID TO A BATTERY

RELATED APPLICATION

The present application is a continuation-in-part application of application Ser. No. 09/545,939, filed Apr. 10, 2000, U.S. Pat. No. 6,213,145.

FIELD OF THE INVENTION

The present invention relates to liquid electrolyte batteries and, more particularly, to a filling pod and a method for supplying fluid to such a battery.

BACKGROUND OF THE INVENTION

A typical liquid electrolyte battery, such as a lead acid battery, includes a plurality of battery cells, each cell including at least one electrode submergible in the liquid electrolyte fluid. For example, a conventional 12-volt battery includes six 2-volt cells. Different battery applications may require different battery configurations. The battery also includes a battery housing having a cover portion substantially enclosing the battery cells and defining a cell port communicating with each of the cells and through which liquid electrolyte fluid is suppliable to the cell.

For optimal battery performance, each electrode is preferably completely submerged in the liquid electrolyte fluid, promoting a maximum degree of electricity-generating electrochemical reaction within each cell of the battery. However, electrolyte fluid is lost from each cell due to outgassing, which occurs during charging of the battery. To maintain the optimal level of battery performance and to maximize the service life of the battery, the electrolyte level in the battery must be regularly checked, and, if the electrolyte level is below the desired level, water must be added to replenish the electrolyte fluid. Accordingly, the electrolyte level in the battery is monitored and adjusted after charging of the battery.

In some constructions, the battery includes a vent cap member to close each cell port. To replenish the electrolyte fluid in the battery, the vent cap is removed from each cell, and electrolyte fluid is supplied to each cell separately through the individual cell ports. The vent caps are then replaced.

In some other constructions, a separate filling device is provided for each cell in the battery. A filling device may replace each conventional vent cap, and the separate filling devices are connected by flexible conduits to a fluid source so that fluid may be supplied to each filling device and to the corresponding cell. Such filling devices are disclosed in U.S. Pat. Nos. 1,791,152; 1,878,223; 4,353,968; 4,424,263; and 4,522,896 and in published PCT Application No. WO 98/40653.

In yet other constructions, a series of filling devices are constructed integrally with the battery or with the battery cover. Such constructions are illustrated in U.S. Pat. No. 3,722,087 and in published PCT Application No. WO 98/40653.

Battery-powered vehicles, such as for example, golf carts and utility vehicles, require periodic charging and replenishment of liquid electrolyte in the batteries. In most cases, the individual cells are replenished one at a time, for example, by an operator using a "watering gun", a water hose or a cup. In typical filling circuits, the filling circuits and procedures require connection of the circuit to a fluid source, either pressurized or in a vacuum arrangement, the source being located off board the vehicle. Flow of fluid through the circuit is caused by pressurized supply fluid or a vacuum applied to the filling circuit.

SUMMARY OF THE INVENTION

One problem with the above-described battery including conventional vent cap members is that, because the battery is typically supported on a battery-powered vehicle or device in a position which does not permit easy access to the battery, it is difficult to monitor the electrolyte level and to replenish the electrolyte fluid in each cell of the battery. Also, for a multiple cell battery, it is inconvenient and time consuming to remove each vent cap, check the electrolyte level in the cell, replenish the electrolyte fluid in the cell, as necessary, and replace the vent cap. Because these replenishment operations are difficult and time consuming, an operator may not replenish the electrolyte level as often as necessary, reducing the performance and service life of the battery.

One problem with the above-described separate filling devices is that the junction between the separate filling devices and the separate conduits provide areas in which leaks or blockages may occur. Also, the flexible conduit used to connect such separate filling devices is subject to being damaged or pinched, possibly preventing the flow of electrolyte to the separate filling devices and to the associated battery cell. In addition, installation of the separate filling devices and proper connection of the flexible conduits between the separate filling devices is inconvenient and time consuming. Further, because of the difficult-to-access position of these filling devices on the vehicle, an operator may not conduct the necessary maintenance to ensure proper operation of the filling devices and of the connecting conduits.

One problem with the above-described filling devices which are constructed integrally with the battery and/or with the battery cover is that such devices are not usable with existing batteries as a substitute for the separate vent caps or for the separate filling devices. Instead, a new battery including such integral filling devices is required to implement such a fluid replenishment system.

The present invention provides a filling pod, a vehicle and a method of supplying fluid to a battery which substantially alleviate the problems with the above-described batteries and filling devices. More particularly, the present invention provides a filling pod for supplying fluid to a battery and having a fluid supply member for each cell and a channel in fluid communication between each fluid supply member and a fluid source. In some constructions, the filling pod is configured to be removably mounted on the cover portion of an existing battery.

In particular, the present invention provides a filling pod including a filling pod housing having a filling pod port fluidly connectable to a fluid source for receiving fluid from the fluid source, a first fluid supply member fluidly connectable to a first cell, a second fluid supply member fluidly connectable to a second cell, and an integral channel in fluid communication between the filling pod port, the first fluid supply member and the second fluid supply member. The channel includes a first channel portion in fluid communication between the filling pod port and the first fluid supply member and a second channel portion in fluid communication between the filling pod port and the second fluid supply member. When fluid is supplied to the filling pod through the filling pod port, a first amount of fluid flows through the first channel portion to the first fluid supply member and to the first cell, and a second amount of fluid flows through the second channel portion to the second fluid supply member and to the second cell.

Preferably, the channel fluidly connects the filling pod port, the first fluid supply member and the second fluid supply member in series. The first channel portion may extend between the filling pod port and the first fluid supply member, and the second channel member may extend between the first fluid supply member and the second fluid supply member and fluidly connect the filling pod port to the second fluid supply member. Also, the channel may fluidly connect the filling pod port, the first fluid supply member and the second fluid supply member such that, when fluid is supplied through the filling pod port, the first amount of fluid flows through the first fluid supply member and to the first cell before the second amount of fluid flows to the second fluid supply member and to the second cell.

Preferably, the filling pod housing further defines a second filling pod port through which fluid flows from the filling pod. The channel may fluidly connect the first filling pod port, the first fluid supply member, the second fluid supply member and the second filling pod port in series, and the second filling pod port may be fluidly connected to the fluid source to supply any excess amount of fluid from the filling pod to the fluid source.

Preferably, the first filling pod port and the second filling pod port are alternatively and selectively fluidly connectable with the fluid source to receive fluid from the fluid source. Also, the filling pod ports are preferably positioned in recessed portions defined by the side wall of the filling pod housing so that the filling pod ports are protected from being damaged.

The filling pod housing may further define vent passages fluidly connected with the channel and fluidly connectable with the cells, a relief chamber for collecting gas, and relief passages fluidly connectable between the vent passages and the relief chamber. Also, the filling pod may further include valves regulating flow of gas through the relief passages.

Also, the invention provides a combination for supplying fluid to a battery, the combination including a battery, and a filling pod for supplying the fluid to the battery. The battery may include a battery housing having a cover portion substantially enclosing cells, the cover portion defining cell ports communicating with the cells and through which fluid is suppliable to the cell. Preferably, fluid supply tubes provide the fluid supply members, and the fluid supply tubes are preferably insertable into the cell ports to fluidly connect the filling pod with the cells. The combination may further include a locking arrangement for locking the filling pod to the battery. Preferably, a battery locking member and a filling pod locking member are engageable to releasably lock the filling pod to the battery.

In addition, the present invention provides a vehicle including a frame supported for movement over ground, a motor supported by the frame and for powering the vehicle, a battery supported by the frame and electrically connectable with the motor to supply power to the motor, and a filling pod for supplying fluid to the battery. The vehicle may further comprise a second battery supported by the frame and electrically connectable to the motor to supply power to the motor, and a second filling pod for supplying fluid to the second battery. Also, the fluid source may be supported on the frame.

Further, the present invention provides a method of supplying fluid to a battery including the acts of providing a filling pod for supplying fluid to the battery, fluidly connecting the filling pod to the battery including fluidly connecting the first fluid supply member to the first cell and fluidly connecting the second fluid supply member to the second cell, fluidly connecting the filling pod port to a fluid source, and supplying fluid from the fluid source to the battery through the filling pod including supplying a first amount of fluid through the first channel portion to the first fluid supply member and to the first cell and supplying a second amount of fluid through the second channel portion to the second fluid supply member and to the second cell.

In the supplying act, the act of supplying a first amount of fluid may occur before the act of supplying the second amount of fluid. Also, the act of fluidly connecting the filling pod to the battery may include inserting a first fluid supply tube into the first cell port to fluidly connect the filling pod with the first cell and inserting a second fluid supply tube into the second cell port to fluidly connect the filling pod with the second cell. The method may further include the act of locking the filling pod to the battery. The locking act may include releasably locking the filling pod to the battery.

One independent advantage of the present invention is that, even with the battery and the filling pod supported in a difficult-to-access position on the vehicle, an operator can easily replenish electrolyte fluid in the battery. Electrolyte fluid is simply added to the filling pod, and the cells are replenished with the electrolyte fluid, as necessary.

Another independent advantage of the present invention is that the filling pod does not include separate filling devices connected by separate conduits, reducing the likelihood of leaks and blockages occurring. Also, because flexible conduits are not required between the fluid supply members, the likelihood of a blockage resulting from damage or pinching of a conduit is reduced.

Yet another independent advantage of the present invention is that, in some constructions, the filling pod of the present invention is configured to be substitutable for the conventional vent caps of existing batteries and may be used with existing batteries without requiring modification or replacement of the battery.

One problem with the above-described battery-powered vehicles and devices which do not include a filling circuit is that individual cells must be replenished one at a time with, for example, a water hose, a time consuming method. This results in inconsistent filling of the cells, with some cells being under-filled and other cells being over-filled. In over-filled cells, acid may overflow into the work area and cause damage or corrosion to components of the vehicle.

One problem with the above-described filling circuits and procedures is that, when the batteries are charged, a separate fluid hook-up step is required before the liquid electrolyte can be replenished in the batteries.

Another problem with the above-described filling circuits and procedures is that a separate source of pressure is required to supply fluid to the filling circuit. Such a separate pressurized source may be a pump or a vacuum connected to the filling circuit.

Yet another problem with the above-described filling circuits and procedures is that, each time the batteries are charged, the separate fluid source must be connected to the filling system, and fluid must be replenished, even if only a small amount of fluid must be replenished.

The present invention also provides a system for supplying fluid to a battery, a vehicle and a method for supplying fluid to a battery which substantially alleviate one or more problems with the above-described filling systems and procedures. More particularly, the present invention provides a fluid supply system in which the gas produced during charging causes fluid flow through the system.

In particular, the present invention also provides a system for supplying fluid to a battery in a vehicle powered by the battery, the vehicle including a vehicle frame supporting the battery, the battery including a battery cell, fluid being transmittable to the cell, gas generated during charging of the battery being transmittable out of the cell. The system is defined as including a tank for holding fluid, and a hydraulic circuit connecting the battery to the tank. The hydraulic circuit is defined as including an inlet conduit connectable between the tank and the cell, and an outlet conduit connectable between the cell and the tank, gas produced during charging of the battery causing fluid flow through the outlet conduit and to the tank. Preferably, the outlet conduit collects gas transmitted from the cell in the form of gas bubbles with fluid entrapped between the bubbles, whereby the bubbles flow to the tank due to pressure build-up in the battery causing flow of fluid through the hydraulic circuit during charging.

A further independent advantage of the present invention is that the fluid supply system consistently and conveniently replenishes liquid electrolyte in the batteries.

Another independent advantage of the present invention is that the fluid source is supported on the vehicle. Therefore, when the batteries are charged, a separate fluid hook-up step is not required before the liquid electrolyte can be replenished in the batteries. The fluid supply system may automatically replenish the batteries.

Yet another independent advantage of the present invention is that the fluid supply system utilizes the pressure of the gas produced during charging to cause fluid flow through the fluid supply system. Therefore, a separate source of pressure, such as a pump or a vacuum, is not required.

A further independent advantage of the present invention is that the fluid supply system automatically replenishes the necessary fluid to the batteries when necessary and each time the batteries are charged. The operator is only required to add fluid to the system when no fluid remains in the fluid source after replenishment.

Other independent features and independent advantages of the invention will become apparent to those skilled in the art upon review of the following detailed description, claims and drawings.

BRIEF DESCRIPTION OF THE DRAWINGS

FIG. 9 is a cross-sectional view of two alternate constructions of a flame arrestor.

FIG. 10 is a side view of another construction of a vehicle including the filling pod embodying the present invention.

FIG. 15 is a partial schematic view of a fluid supply system including the filling pod embodying the present invention.

Figure 1:
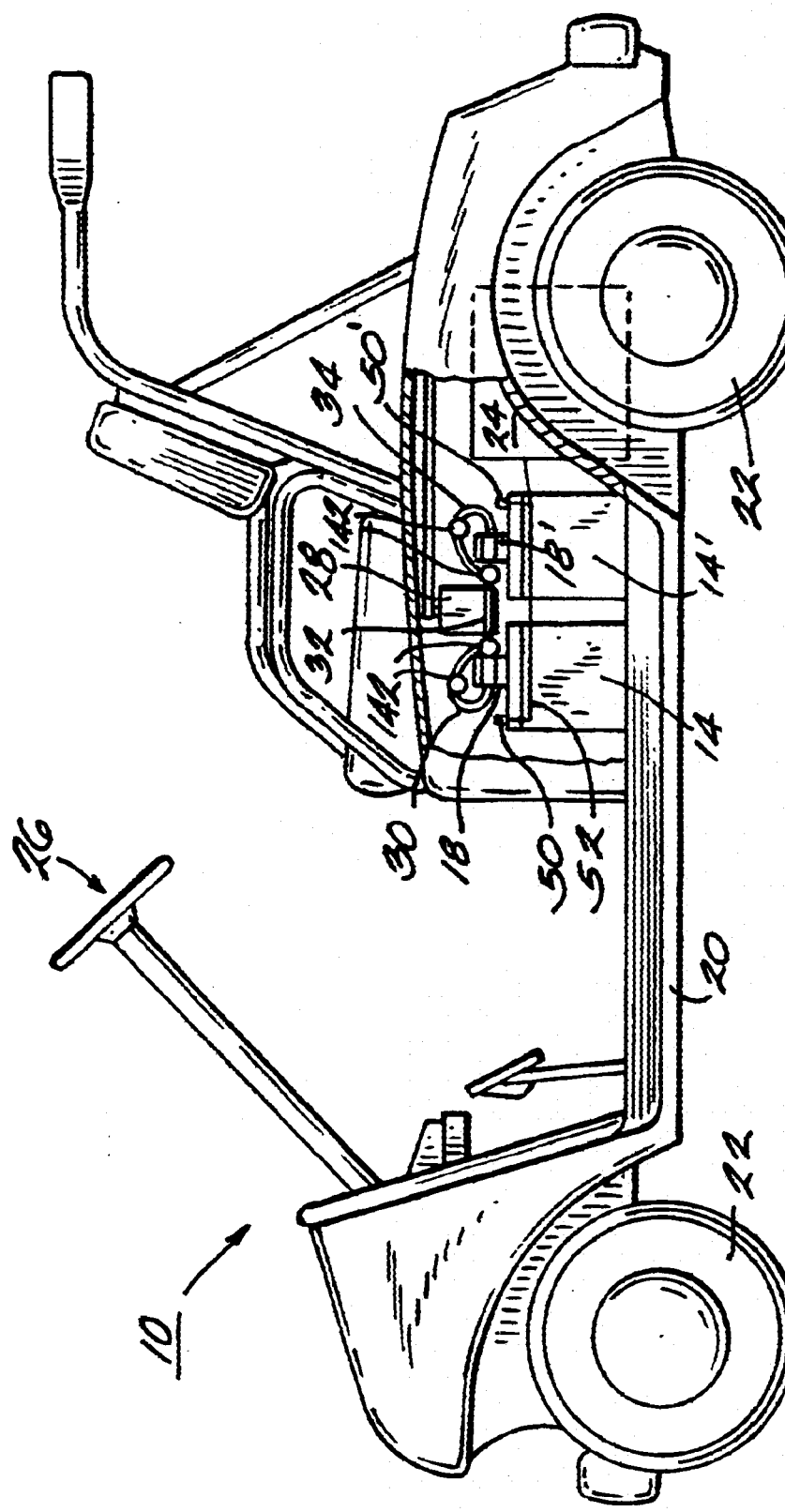
FIG. 1 is a side view of a vehicle including a filling pod embodying the present invention.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION OF THE PREFERRED EMBODIMENT

A device or vehicle, such as, for example, an electric golf car 10 or a utility vehicle, powered by at least one liquid electrolyte battery 14 and including a filling device or a filling pod 18 embodying the invention is illustrated in FIG. 1. As shown in FIG. 1, the golf car 10 includes a first filling pod 18 fluidly connected to and for supplying fluid F to a first battery 14 and a second filling pod 18' fluidly connected to and for supplying fluid F to a second battery 14'.

The golf car 10 includes a frame 20 supported by wheels 22 for movement over ground. The golf car 10 also includes an electric motor 24 (schematically illustrated) supported on the frame 20 and electrically connectable with a plurality of batteries 14 (two shown) to power the golf car 10. A steering assembly 26 (partially illustrated) is provided to control the golf car 10.

In the illustrated construction, a source 28 of fluid F is supported on the frame 20. The source 28 is preferably a container into which fluid F is poured and from which fluid F is supplied to the filling pods 18 and to the batteries 14. Tubing or a conduit 30 connects the source 28 to the first filling pod 18, tubing or a conduit 32 connects the first filling pod 18 to the second filling pod 18', to connect the second filling pod 18' to the source 28, and tubing or a conduit 34 connects the second filling pod 18' back to the source 28. In the construction illustrated in FIG. 1, the source 28, the first filling pod 18 and the second filling pod 18' are fluidly connected in series and in a closed loop.

In the illustrated construction, the batteries 14 and 14' are identical, and the filling pods 18 and 18' are identical. Therefore, only the first battery 14 and only the first filling pod 18 will be described in detail. Corresponding structure in the second battery 14' and in the second filling pod 18' is indicated by the same reference number "'".

Figure 2:
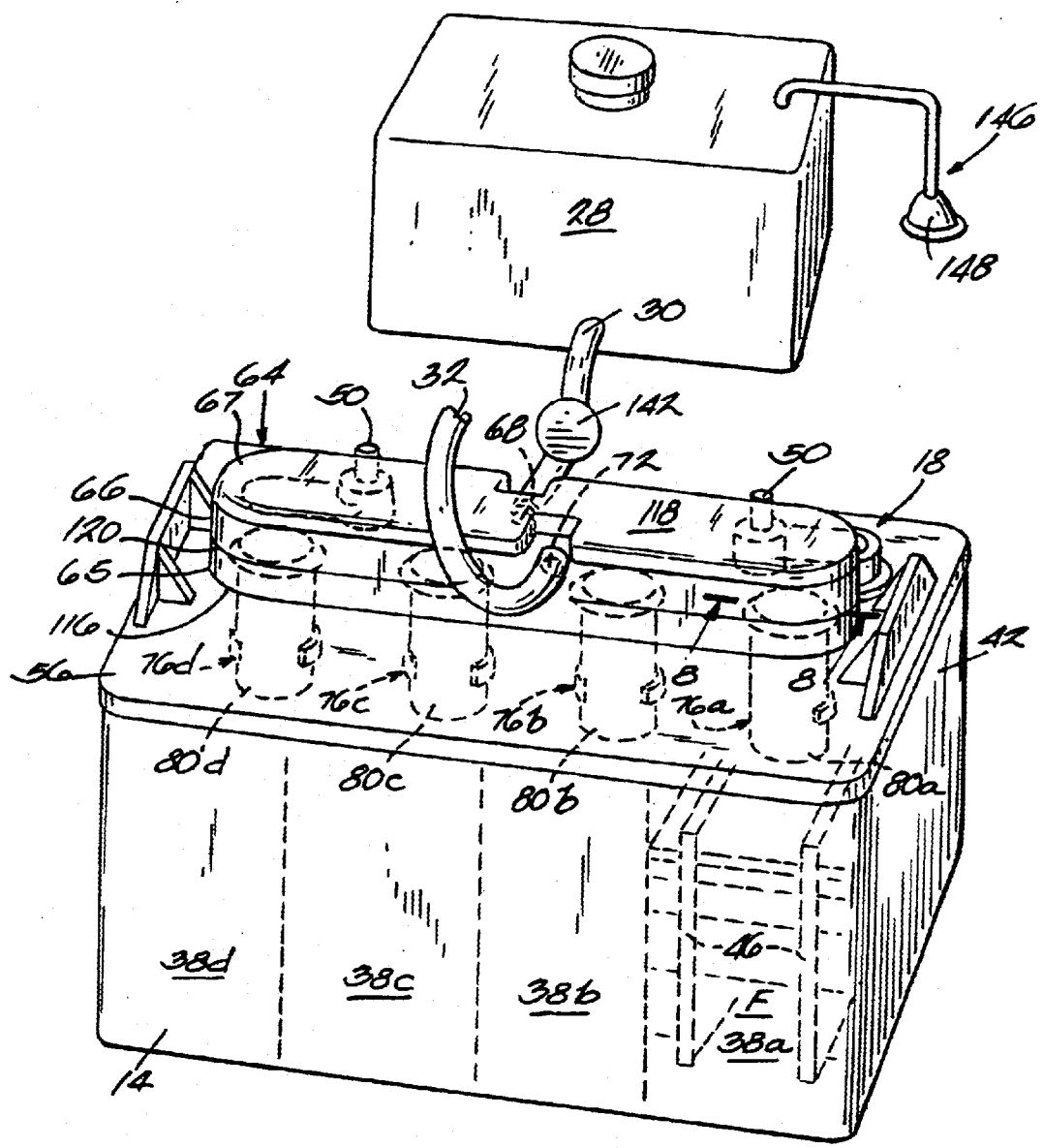
FIG. 2 is a perspective view of a battery and of the filling pod embodying the present invention.
Figure 3:
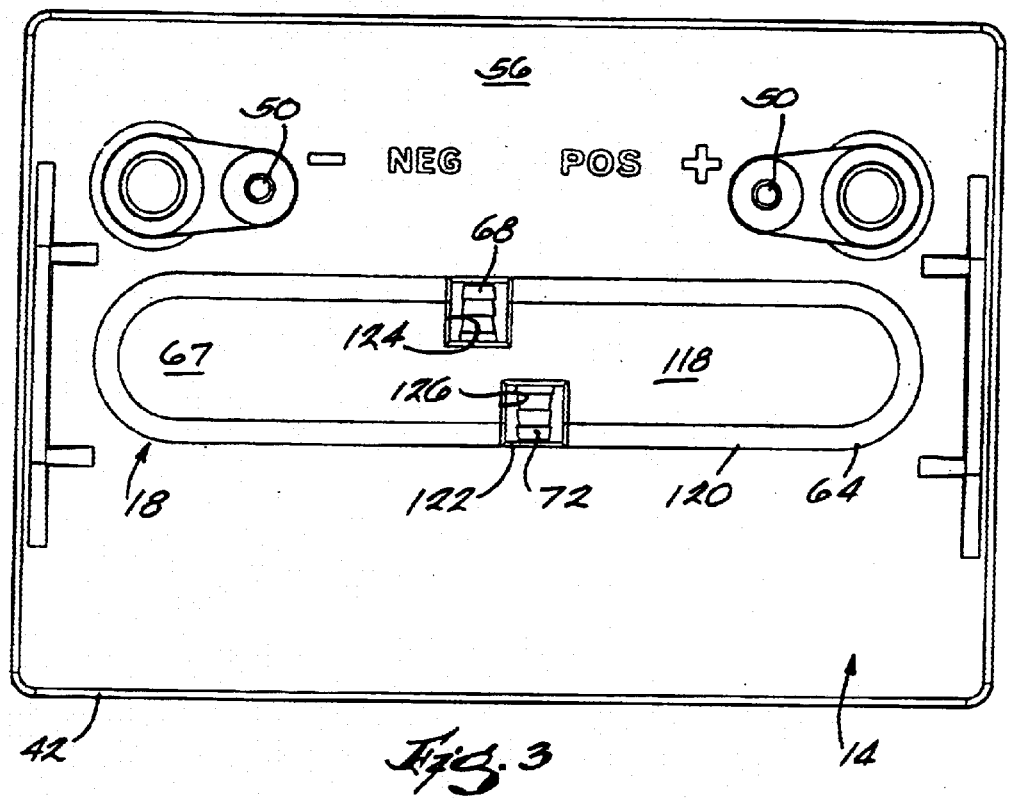
FIG. 3 is a top view of the battery and of the filling pod shown in FIG. 2.

In the illustrated construction, the battery 14 is a liquid electrolyte battery, such as a lead acid battery. As shown in FIG. 2, the battery 14 is an 8-volt battery and includes four approximately 2-volt battery cells 38a, b, c and d. Components corresponding to or associated with each cell 38a, b,

*c* or *d* are identified by the same italicized letter *a, b, c* or *d*. It should be understood that, in other constructions (not shown), a battery may be provided with a different voltage and having a different number of battery cells. It should also be understood that the filling pod 18 of the present invention may be used with any type of battery requiring fluid replenishment.

The cells 38 are supported by a battery housing 42, and each cell 38 includes two or more electrodes 46 (two electrodes 46 schematically illustrated for only the first cell 38*a*) which are submergible in the liquid electrolyte fluid F. The cells 38 are connected by a battery electrical circuit (not shown) to battery terminals 50. An electrical circuit 52 (schematically illustrated in FIG. 1) electrically connects the battery 14 to the motor 24 to selectively supply power to the motor 24.

As shown in FIG. 2, the battery housing 42 includes a cover portion 56 substantially enclosing the battery cells 38. The cover portion 56 defines (see FIG. 5) four cell ports 60*a–d*, and each cell port 60 communicates with a corresponding cell 38. Through each cell port 60, fluid F is supplied to the corresponding cell 38, and gases produced during battery charging are evacuated from the cell 38.

As shown in FIGS. 2–5, the filling pod 18 includes a filling pod housing 64 which may be formed of several connectable components, such as a base 65, an intermediate portion 66 and a top portion 67. The filling pod housing 64 has a first filling pod port 68 and a second filling pod port 72, each fluidly connectable with the fluid source 28. In the illustrated construction, the filling pod ports 68 and 72 are formed on the intermediate portion 66 of the filling pod housing 64. Also, in the illustrated construction, the filling pod ports 68 and 72 are alternatively and selectively fluidly connectable with the source 28 to receive fluid F from the source 28, and the filling pod housing 64 is preferably generally symmetrical. In the illustrated construction, the first filling pod port 68 is connected to the source 28 to receive fluid F from the source 28, and any excess amount of fluid F flows from the second filling pod port 72 and from the filling pod 18.

The filling pod housing 64 also has (see FIGS. 2 and 4–5) four fluid supply members 76*a–d*, corresponding to the number of cells 38 in the battery 14. A fluid supply tube 80*a–d* provides each fluid supply member 76*a–d*. Preferably, the fluid supply tubes 80*a–d* are inserted into the cell ports 60*a–d* to fluidly connect the filling pod 18 to the cells 38*a–d*. A seal arrangement (not shown) provides a seal between the filling pod 18 and the battery 14. The fluid supply tubes 80*a–d* may be connected to the base portion 65 of the filling pod housing 64, and, in some constructions, only portions of the fluid supply members 76*a–d* are provided by the fluid supply tubes 80*a–d*.

Each fluid supply member 76 may incorporate the construction of any typical pressure trap device used to supply fluid to a battery or of any of the above-described separate filling devices. Preferably, each fluid supply member 76 is constructed in a manner similar to the filling device illustrated in PCT Application No. WO 98-40653, published Sep. 17, 1998 and assigned to Trojan Battery Company, which is hereby incorporated by reference.

Figure 6:
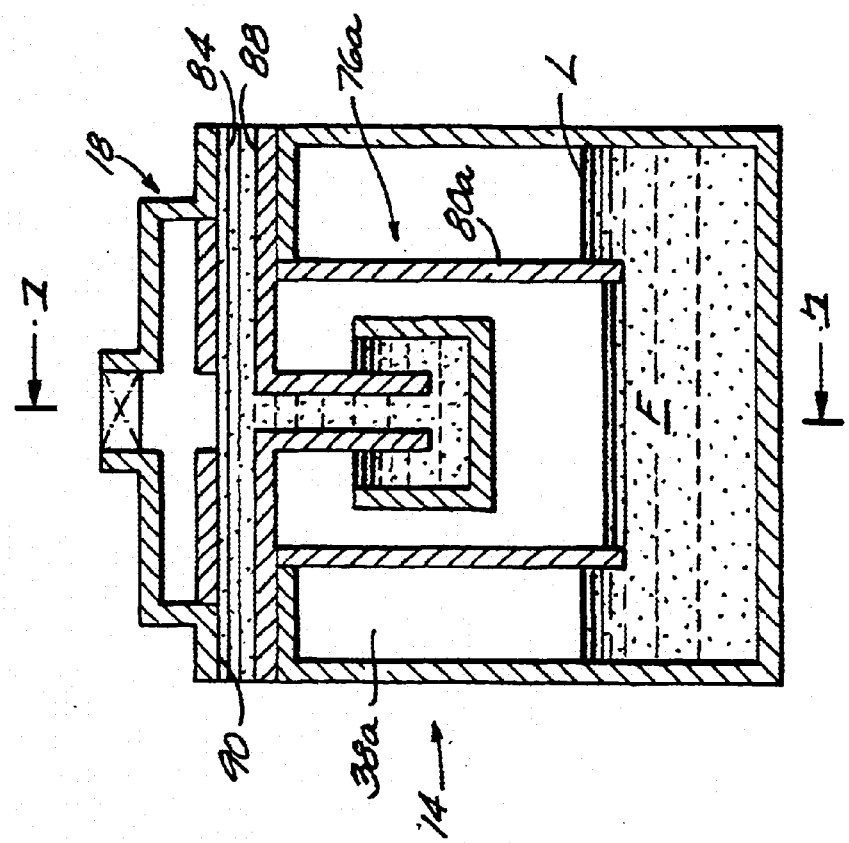
FIG. 6 is a cross-sectional view of a portion of a battery cell and a fluid supply member.

A simplified pressure trap construction for a fluid supply member 76 is illustrated in FIG. 6. In this construction, when the fluid level is below the desired level L (shown in phantom lines in FIG. 6), fluid F flows through the fluid supply member 76 and into the cell 38. Gas flows from the cell 38 and through the fluid supply member 76 to allow fluid F into the cell 38. When the fluid F reaches the desired level L in the cell 38 (illustrated in solid lines FIG. 6), the internal pressure in the cell 38 equalizes, and fluid flow into the cell 38 stops. Additional fluid F in the filling pod 18 flows to the next downstream fluid supply member 76, if there is one in the filling pod 18, or through the second filling pod port 72 and from the filling pod 18.

The filling pod housing 64 also has (see FIG. 5) an integral channel 84 in fluid communication between the filling pod ports 68 and 72 and the fluid supply members 76*a–d*. In the illustrated construction, the integral channel 84 is formed in the base portion 65 of the filling pod housing 64. Also, in the illustrated construction, the channel 84 includes a first channel portion 88 in fluid communication between the first filling pod port 68 and the first fluid supply member 76*a*, a second channel portion 90 in fluid communication between the first fluid supply member 76*a* and the second fluid supply member 76*b*, a third channel portion 92 in fluid communication between the second fluid supply member 76*b* and the third fluid supply member 76*c*, a fourth channel portion 94 in fluid communication between the third fluid supply member 76*c* and the fourth fluid supply member 76*d*, and a fifth channel portion 96 in fluid communication between the fourth fluid supply member 76*d* and the second filling pod port 72. In the illustrated construction, the channel 84 thus connects the first filling pod port 68, the fluid supply members 76*a*, 76*b*, 76*c* and 76*d* and the second filling pod port 72 in a series arrangement. It should be understood that, in other constructions (not shown), the channel 84 may connect the components of the filling pod 18 in another arrangement, such as a parallel arrangement or a combination series/parallel arrangement.

In the illustrated construction, when fluid F is supplied to the first filling pod port 68, a first amount of fluid F flows through the first fluid supply member 76*a* and to the first cell 38*a* before a second amount of fluid F flows to the second fluid supply member 76*b* and to the second cell 38*b* and so on to the other fluid supply members 76*c* and 76*d* and to the other cells 38*c* and 38*d*. Also, any excess fluid F flows from the second filling pod port 72 and from the filling pod 18 after the amounts of fluid F have flowed through the fluid supply members 76 and to the corresponding cells 38.

In the illustrated series arrangement, the fluid supply members 76*a–d* may fill the associated cells 38*a–d* in a manner in which the first cell 38*a* is filled completely before fluid flows to the next cell 38*b*, and so on to the next cells 38*c* and 38*d* (i.e., "perfect series"). In this manner, the first amount of fluid F is the full amount of fluid necessary to replenish the first cell 38*a*, and so on.

Alternatively, the cells 38*a–d* may be filled in a manner in which, as replenishment of the first cell 38*a* nears completion, fluid begins to trickle to the next cell 38*b*, and so on (i.e., "quasi-series"). As the cell 38*a* fills, the flow rate into the cell 38*a* decreases while the flow rate into the filling pod 18 continues at relatively the same rate. In this other manner, the first amount of fluid F is not the full amount of fluid necessary to replenish the cell 38*a*. Rather, fluid F will continue to flow into the cell 38*a* after fluid F begins to trickle to the next cell 38*b*, and so on.

Figure 5:
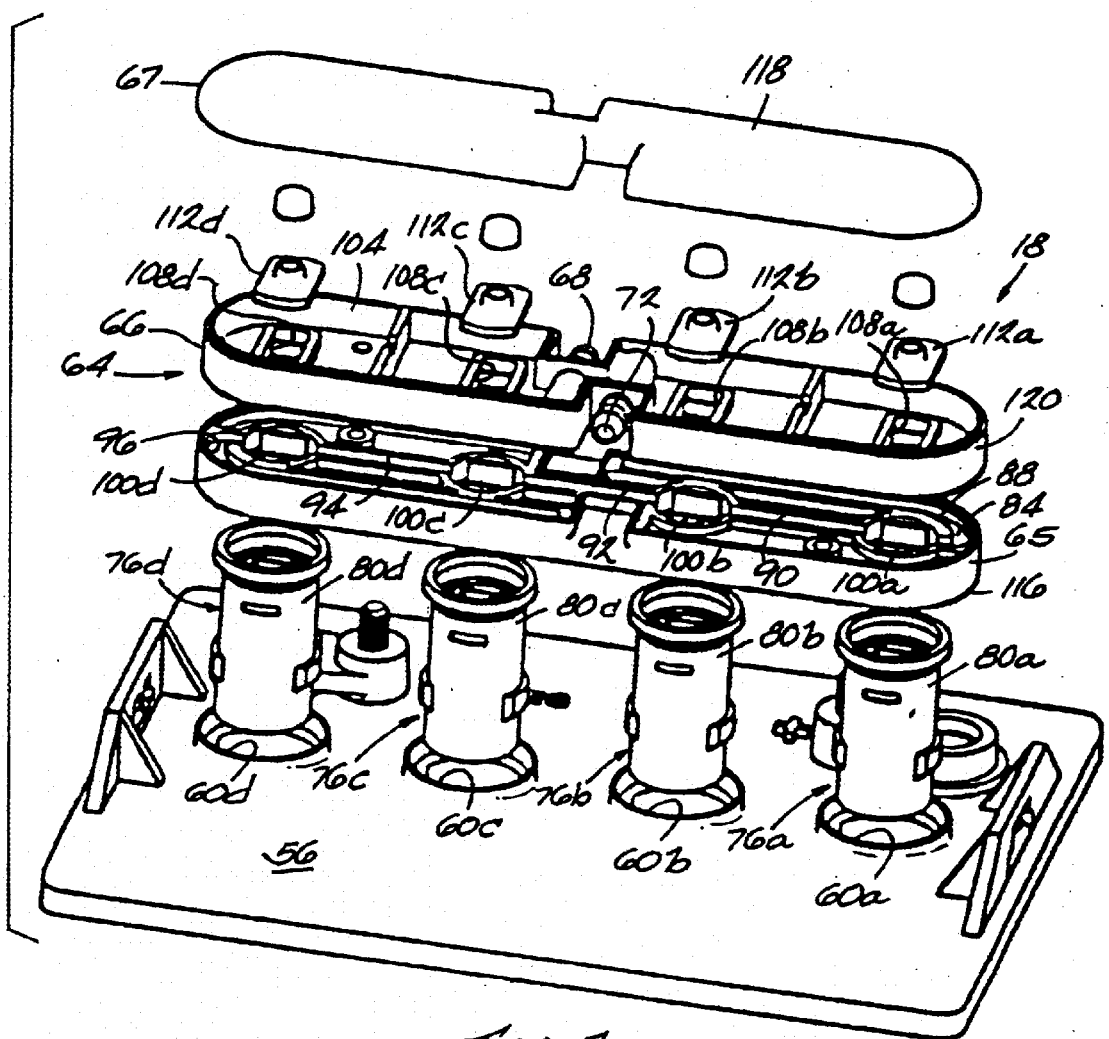
FIG. 5 is an exploded view of the portion of the battery and of the filling pod shown in FIG. 4.
Figure 7:
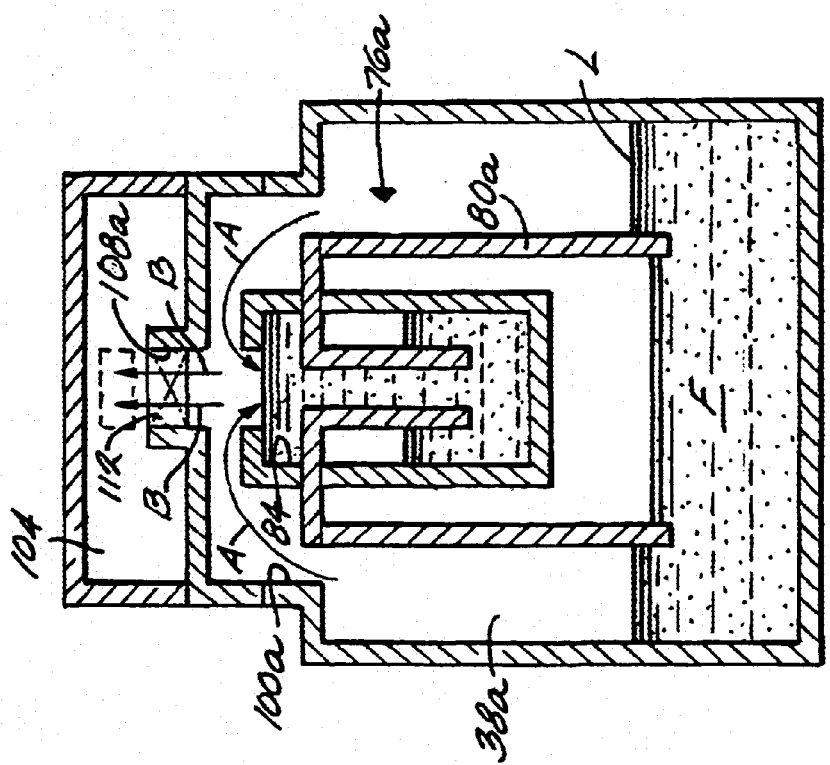
FIG. 7 is a cross-sectional view taken generally along line 7—7 in FIG. 6.

As shown in FIGS. 5 and 7, the filling pod 18 also includes a bypass or back-up gas vent arrangement. In the illustrated construction, the back-up gas vent arrangement is provided in the intermediate portion 66 and the top portion 67 of the filling pod housing 64.

The filling pod housing 64 also defines a vent passage 100*a–d* fluidly connected with the channel 84 and fluidly connectable with a corresponding cell 38a–d. As shown in FIG. 7, the vent passage 100 provides a flow path for gas from the corresponding cell 38. Also, the filling pod housing 64 further defines (see FIG. 5) a relief chamber 104 for collecting gas and a relief passage 108a–d fluidly connectable between a corresponding vent passage 100a–d and the relief chamber 104. In addition, the filling pod 18 further includes a valve 112a–d to regulate flow of gas through a corresponding relief passage 108 to the relief chamber 104. Each valve 112 is pressure dependent and has an open position, in which gas flows from the corresponding cell 38 to the relief chamber 104, and a closed position, in which gas flow from the corresponding cell 38 to the relief chamber 104 is prevented.

During charging of the battery 14, gas is produced in each cell 38. As shown by arrows A in FIG. 7, the gas typically flows from the cell 38 through the vent passage 100 and into the channel 84, through which the gas is evacuated from the battery 14. If an excess amount of gas is produced or if gas flow through the channel 84 is limited or prevented (i.e., due to blockage of the channel 84 or frozen water in the system), the increased pressure of the gas (in the illustrated construction, 1.5 psi to 2 psi) will cause the valve 112 to open (shown in phantom lines in FIG. 6), allowing the excess gas to flow (as shown by arrows B) through the relief passage 108 and to the relief chamber 104. The excess gas will then be vented from the relief chamber 104 and from the filling pod 18 to prevent damage to the filling pod 18 and/or to the battery 14. This arrangement provides back-up gas venting, i.e., a "burp valve", if the battery 14 is charged when the system is blocked or frozen.

Figure 4:
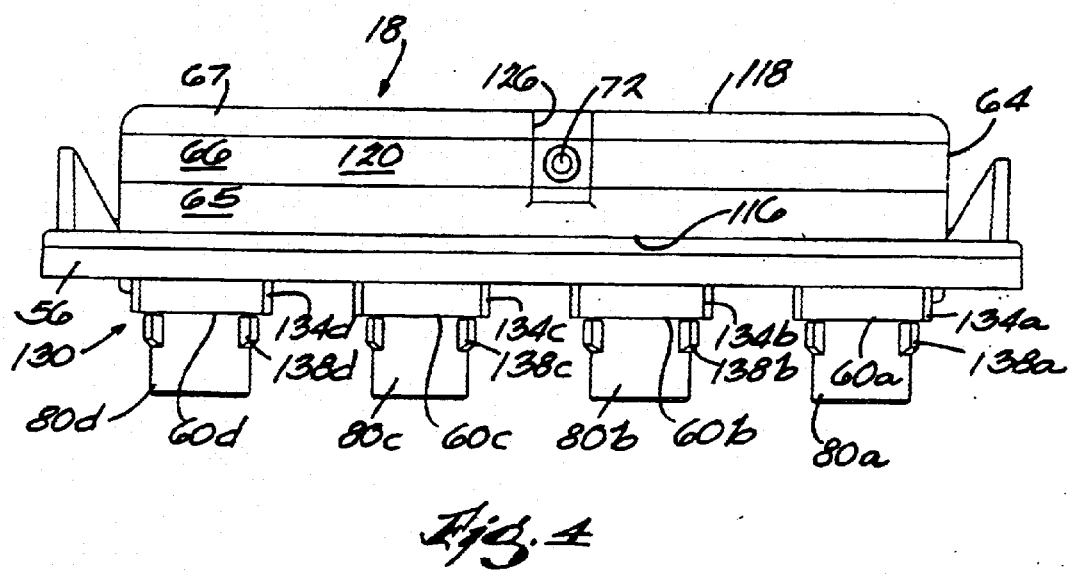
FIG. 4 is a side view of a portion of the battery and of the filling pod shown in FIG. 2.

As shown in FIGS. 2 and 4–5, the filling pod housing 64 includes a bottom wall 116 positionable adjacent the cover portion 56 of the battery 14, a top wall 118 spaced from the bottom wall 116 and a side wall 120 extending between the bottom wall and the top wall 116 and 118. The side wall 120 defines (see FIG. 3) a periphery 122 of the filling pod housing 64. In the illustrated construction, the side wall 120 defines a first recessed portion 124, in which the first filling pod port 68 is completely positioned, and a second recessed portion 126, in which the second filling pod port 72 is completely positioned. Accordingly, the filling pod ports 68 and 72 are protected from being inadvertently damaged or broken during shipment, installation, maintenance or removal of the filling pod 18.

Figure 8:
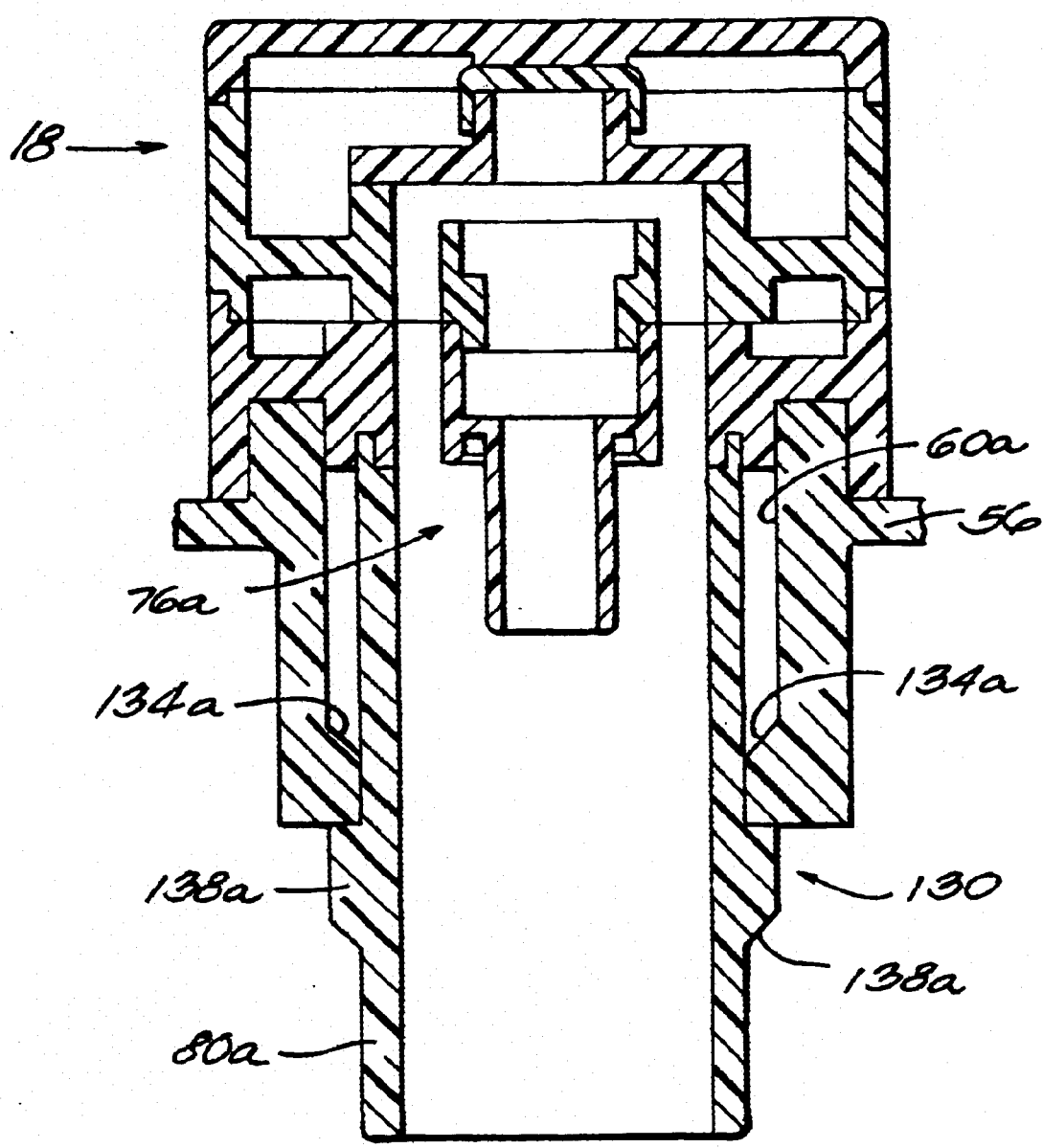
FIG. 8 is a cross-sectional view taken generally along line 8—8 in FIG. 2 and illustrating the locking arrangement.

As shown in FIGS. 4 and 8, a locking arrangement 130 is provided to lock the filling pod 18 to the battery 14. The locking arrangement 130 includes battery locking members 134a–d, supported adjacent the corresponding cell port 60a–d, and filling pod locking members 138a–d, supported on the corresponding fluid supply tube 80a–d. The filling pod locking members 138 engage the battery locking members 134 when the fluid supply tubes 80 are inserted into the corresponding cell ports 60. Engagement of the battery locking members 134 and the filling pod locking members 138 locks the filling pod 18 to the battery 14.

In the illustrated construction, the locking arrangement 130 allows the filling pod 18 to be removably mounted on the battery 14. The battery locking members 134 are preferably flexible, and the filling pod locking members 138 are preferably rigid. The filling pod locking members 138 extend along only two sides of the fluid supply tubes 80. The locking arrangement 130 allows the filling pod 18 to be removed from the battery 14 while leaving the battery 14 and the battery locking members 134 substantially intact.

In the illustrated construction, flame arrestors 142 are included in the conduits 30, 32 and 34 between the source 28 of fluid F and the filling pods 18 and 18'. The flame arrestors 142 may be any type of conventional flame arrestors, such as, for example, the "water quench" type flame arrestors 144 and 145 (shown in FIG. 9). In the event of arcing, the flame arrestors 142 prevent flame propagation between filling pods 18 and 18' and between the source 28 and the filling pods 18 and 18'. It should be understood that, in other constructions (not shown), one or more flame arrestors may be constructed integrally with a filling pod.

The source 28 includes a vent 146 for venting gas generated during operation and charging of the batteries 14 and 14'. The vent 146 includes a flame arrestor 148 to prevent flame from passing into the source 28, should the vented gases ignite.

To use the filling pod 18, the filling pod 18 is mounted on the battery 14. The fluid supply tubes 80 are inserted into the corresponding cell ports 60. The battery locking members 134 and the filling pod locking members 138 engage to lock the filling pod 18 to the battery 14. Similarly, the second filling pod 18' is mounted on the second battery 14'. In the illustrated construction, the conduit 30 is connected between the source 28 and the first filling pod 18, the conduit 32 is connected between the filling pods 18 and 18', and the conduit 34 is connected between the second filling pod 18' and the source 28.

Initially, fluid F is added to the source 28. Fluid F flows through the conduit 30 to the first port 68 of the first filling pod 18. Fluid F enters the channel 84 and flows through the channel portions to each fluid supply member 76 and to each cell 38, as needed. As discussed above, as fluid F is depleted in a cell 38, the pressure in the fluid supply member 76 decreases, allowing fluid flow into the cell 38. When the electrolyte fluid level in the cell 38 reaches the desired level L, the internal pressure in the cell 38 equalizes, and fluid flow into the cell 38 stops.

After fluid flow to a cell 38 stops, additional fluid F in the filling pod 18 flows through the channel 84 to the next downstream fluid supply member 76 and to the next cell 38. The electrolyte fluid F in each cell 38 is replenished in a similar manner. After all the cells 38 in the first battery 14 are replenished, any excess fluid F flows through the second filling pod port 72 and from the filling pod 18.

In the illustrated series arrangement (FIG. 1), the excess fluid F flows from the second filling pod port 72 of the first filling pod 18, into the conduit 32 and to the first filling pod port 68' of the second filling pod 18' to replenish the electrolyte fluid F in the cells 38' of the second battery 14' in the manner described above. In the illustrated closed loop arrangement (FIG. 1), any excess fluid F flowing from the second filling pod 18' after the cells 38' in the second battery 14' are replenished flows from the second filling pod port 72' of the second filling pod 18', into the conduit 34 and back to the source 28. If fluid F remains in the source 28 after replenishment, the fluid F may be automatically resupplied through the filling pods 18 and 18' to the batteries 14 and 14' as needed during operation of the golf car 10.

In the illustrated closed loop arrangement (FIG. 1), the operator has an indication as to whether additional fluid F is required to be added to the batteries 14 and 14' at times other than during normal electrolyte fluid replenishment. Accordingly, fluid F can be added to the source 28, as necessary, when no fluid F remains in the source 28. In an open loop arrangement (FIGS. 11–12), the operator continues to add fluid F to the source 28B or 28C until fluid flows from the conduit 34B or 34C, respectively, which, in these constructions, is not connected back to the source 28B or 28C.

During charging of the batteries 14 and 14', the batteries 14 and 14' generate a significant amount of gas which needs to be expelled from each cell 38 and from the system. With normal amounts of gas, the gas is vented through the channel 84 as the fluid F flows through the channel 84. If a significant amount of gas needs to be expelled or if the channel 84 becomes blocked, the excessive amount of gas will be vented through the relief passages 108 to the relief chamber 104 to prevent damage to the filling pod 18.

Figure 12:
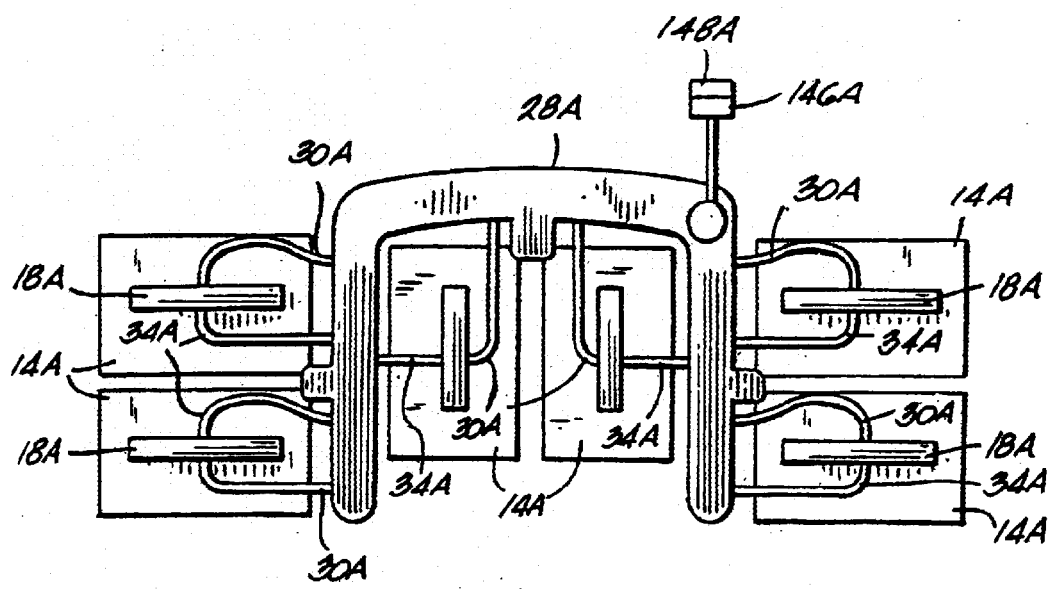
FIG. 12 is a plan view of the fluid supply system shown in FIG. 11.
Figure 11:
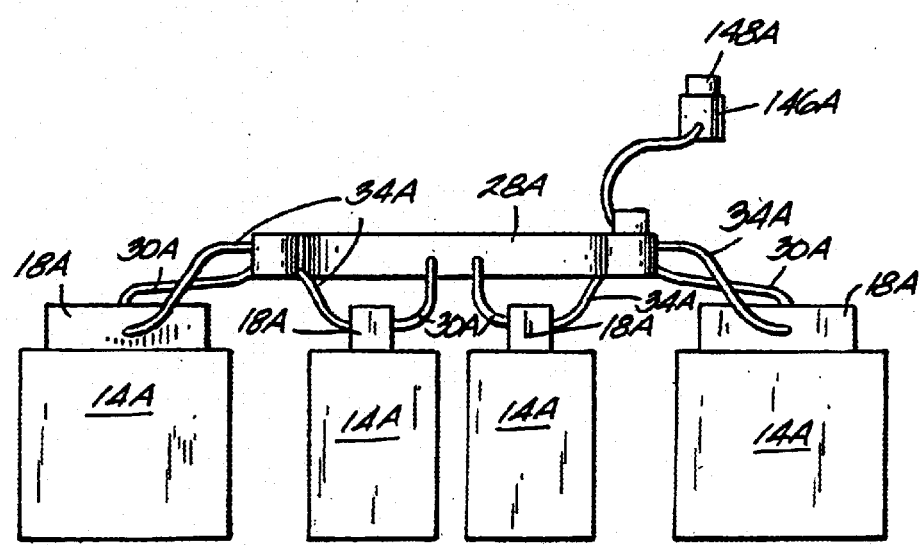
FIG. 11 is a view taken generally along line 11—11 in FIG. 10 and illustrating a fluid supply system.

FIGS. 10–12 illustrate another construction of a golf car 10A including a filling pod 18A embodying the invention. Common elements are identified by the same reference number "A".

In this construction, the source 28A, the first filling pod 18A and the second filling pod 18A' are connected in a parallel arrangement. A conduit 30A or 30A' connects the source 28A to each filling pod 18A or 18A', and a conduit 34A or 34A' connects each filling pod 18A or 18A' back to the source 28A to provide a closed loop arrangement.

As shown in FIGS. 11–12, the golf car 10A is powered by six batteries 14A, and a filling pod 18A is provided for each battery 14A. In the illustrated construction, the source 28A and the filling pods 18A are connected in separate, parallel, closed loop circuits.

It should be understood that, if more than two filling pods (such as filling pods 18) are provided (not shown), the source and the filling pods may be connected in a combination series/parallel arrangement.

Figure 13:
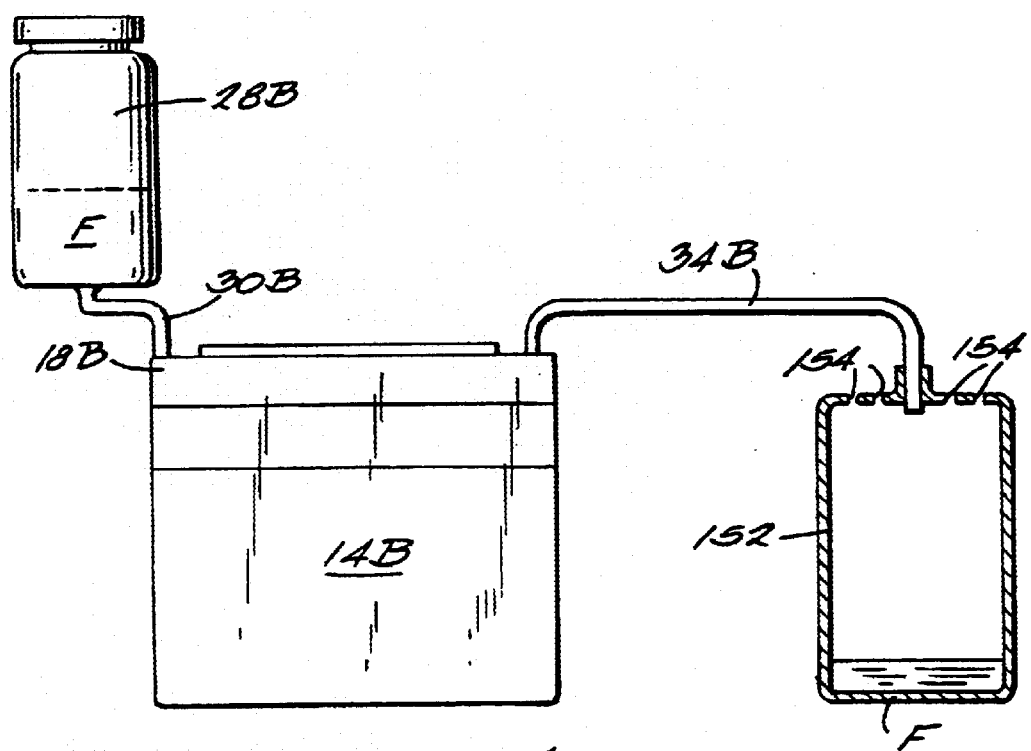
FIG. 13 is a partial schematic view of another construction of a fluid supply system including the filling pod embodying the present invention.
Figure 14:
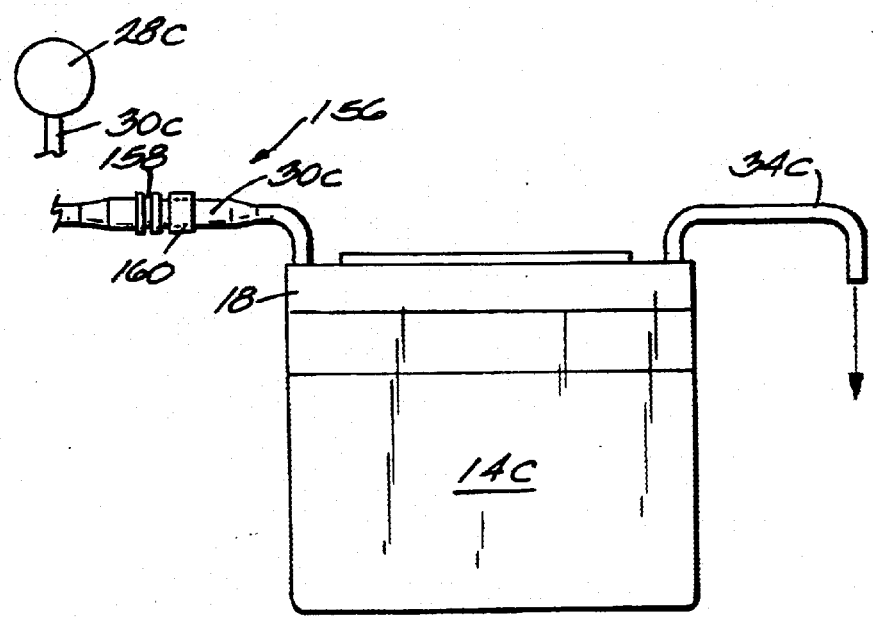
FIG. 14 is a partial schematic view of yet another construction of a fluid supply system including the filling pod embodying the present invention.

FIGS. 13 and 14 illustrate yet other constructions of portions of a golf car 10B and 10C, respectively, including a filling pod 18B and 18C, respectively, embodying the invention. Common elements are identified by the same reference number "B" or "C", respectively.

In these constructions, the source 28B or 28C and the first filling pods 18B and 18B' (one shown) or 18C and 18C' (one shown) are connected in an open loop, so that fluid F is not provided from the filling pods and back to the source 28B or 28C. Excess fluid F flows from the conduit into (see FIG. 13) a container 152 or (see FIG. 14) onto the ground, indicating the completion of fluid replenishment. It should be understood that, in these constructions, the filling pods may be connected in a series arrangement or in a parallel arrangement.

As shown in FIG. 13, the container 152 includes one or more vent openings 154 through which gas is vented when fluid F flows into the container 152. The container 152 is preferably supported on the vehicle frame and is an evaporator tank. The container 152 preferably includes several vent openings 154 so that excess fluid F will evaporate from the container 152 during operation of the golf car.

As shown in FIG. 14, a quick-connect assembly 156 may be included in the conduit 30C to selectively connect the source 28C to the filling pods 18C and 18C' (one shown). In this construction, the source 28C of fluid F is not supported on the frame 20C. During fluid replenishment, the operator connects the quick-connect members 158 and 160 to connect the source 28C to the filling pods 18C and 18C'. After fluid replenishment, the source 28C is disconnected from the filling pods 18C and 18C'. In other constructions (not shown), a quick-connect assembly may also be included in the conduit 34C to connect the filling pods 18C and 18C' back to the source 28C so that excess fluid F flows back to the source 28C.

It should be understood that, in other constructions (not shown) and for some aspects of the invention, the filling pod 18 and/or components of the filling pod 18, as explained above, may be formed integrally with a battery or with a battery cover.

For example, the base portion 65 may be formed with or non-removably connected to the battery cover 56. In such a construction, the intermediate portion 66, the top portion 67 and the fluid supply tubes 80a–d are then connected with the base portion 65 and the battery cover 56, either removably or non-removably.

Also, it should be understood that, in other constructions (not shown), a single filling pod may be provided to supply fluid F to more than one battery 14, eliminating the requirement of conduits (such as the conduit 32) between the separate filling pods 18.

The fluid supply system for supplying fluid to the battery 14 is illustrated in more detail in FIG. 15. The fluid supply system may be used to supply more than one battery 14, and, in such constructions, the batteries 14 may be connected in a series arrangement (as shown in FIG. 1), in a parallel arrangement (as shown in FIGS. 10–12), or, if more than two batteries 14 are provided, in a combination series/parallel arrangement (not shown).

As shown in FIG. 15, the conduit 30 connects the source 28 to the filling pod 18 and to the battery 14, and the conduit 34 connects the filling pod 18 and the battery 14 back to the source 28. A valve 164 controls the flow of fluid through the conduit 30. In the illustrated construction, the valve 164 provides flow through the conduit 30 only in the direction from the source 28 to the filling pod 18 (in the direction of arrow A). In the illustrated construction, the valve 164 is a check valve, such as a miniature diaphragm check valve, Part No. A687 from Walworth Sales and Marketing, 100 Wisconsin Avenue, Walworth, Wis. In other constructions (not shown), the valve may be a mechanical valve or an electronic valve.

For some aspects of the invention, the source 28 is positioned at a height above batteries 14 and 14' so as to provide sufficient hydraulic head pressure to overcome any pressure loss across the conduit 30, the valve 164, the batteries 14 and 14' and the conduit 34. In operation, in some aspects of the invention, the fluid supply system, relying on gravity for head pressure, will reach a point of static equilibrium with the fluid located in conduit 30, the filling pod 18, the battery 14 and partially up conduit 34.

As shown in FIG. 15, during charging of the battery 14, gas is produced. To overcome the equilibrium in the fluid supply system, the gas is collected as discrete gas bubbles B in the conduit 34 and are transmitted from the battery 14. Fluid F is entrapped between the gas bubbles B, and the entrapped fluid F and gas bubbles B flow to the source 28 due to pressure build-up in the battery 14, causing flow of fluid F through the hydraulic circuit during charging. The battery gas generated during operation and charging is vented through the vent 146 and through the flame arrestor 148.

If excess fluid remains in the source 28 after replenishment, the fluid F may be automatically resupplied through the filling pod 18 to the battery 14 as needed during operation of the golf car 10. After charging, the gas is vented from the hydraulic circuit, reducing the pressure in the hydraulic circuit, and the valve 164 opens, allowing fluid F to flow through the hydraulic circuit to the battery 14 to replenish the battery 14. Any excess fluid after this replenishment remains in the conduit 34 until the next charging, and the cycle repeats.

For some aspects of the invention, it is desirable that the conduit 34 have an inside diameter (ID) within a given range so that the bubbles B are trapped against inside walls of the conduit 34. If conduit 34 is too large, the bubbles B do not completely fill the conduit and fail to trap fluid F between the bubbles B, in which case, fluid F will not be circulated effectively. In conduits having an ID equal to or larger than ⅜ inch, the bubbles B do not trap fluid F. In conduits having an ID slightly less than ⅜ inch, the bubbles B may begin to trap fluid F and start flow, although at a less than optimum rate. In conduits having an ID of ¼ inch, bubbles B form at a desirable rate and the flow becomes acceptable. Conduits having an ID smaller than ¼ inch will work to cause acceptable flow, down to a lower size limit determined by the amount of gas flow through the conduit 34 required to safely vent the charging gas from the battery 14. Thus, for some aspects of the invention, the ID of the conduit 34 is preferably in the range of less than ⅜ inch (+/− size tolerance) to a size required to safely vent the charging gas from the battery 14, and, most preferably, for some aspects of the invention, the ID of the conduit 34 is ¼ inch.

Various features of the present invention are set forth in the following claims.

We claim:

1. A filling pod for supplying fluid to a battery, the battery including a first cell and a second cell, each cell including at least one electrode submergible in the fluid, said filling pod comprising:
   a filling pod housing having
      a filling pod port fluidly connectable to a fluid source for receiving fluid from the fluid source,
      a first fluid supply member fluidly connectable to the first cell,
      a second fluid supply member fluidly connectable to the second cell, and
      an integral channel in fluid communication between the filling pod port, the first fluid supply member, and the second fluid supply member, the channel including a first channel portion in fluid communication between the filling pod port and the first fluid supply member and a second channel portion in fluid communication between the filling pod port and the second fluid supply member, wherein, when fluid is supplied to said filling pod through the filling pod port, a first amount of fluid flows through the first channel portion to the first fluid supply member and to the first cell, and a second amount of fluid flows through the second channel portion to the second fluid supply member and to the second cell.

2. The filling pod as set forth in claim 1 wherein the channel fluidly connects the filling pod port, the first fluid supply member and the second fluid supply member in series.

3. The filling pod as set forth in claim 1 wherein the first channel portion extends between the filling pod port and the first fluid supply member, and wherein the second channel member extends between the first fluid supply member and the second fluid supply member and fluidly connects the filling pod port to the second fluid supply member.

4. The filling pod as set forth in claim 1 wherein the channel fluidly connects the filling pod port, the first fluid supply member and the second fluid supply member such that, when fluid is supplied through the filling pod port, the first amount of fluid flows through the first fluid supply member and to the first cell before the second amount of fluid flows to the second fluid supply member and to the second cell.

5. The filling pod as set forth in claim 1 wherein the battery further includes a battery housing having a cover portion substantially enclosing the first cell and the second cell, the cover portion defining a first cell port and a second cell port communicating with the first cell and the second cell, respectively, and through which fluid is suppliable to the cell, and wherein the first fluid supply member is connectable with the first cell port to supply fluid through the first cell port and to the first cell, and the second fluid supply member is connectable with the second cell port to supply fluid through the second cell port and to the second cell.

6. The filling pod as set forth in claim 5 wherein the filling pod housing includes a first fluid supply tube and a second fluid supply tube providing the first fluid supply member and the second fluid supply member, respectively, the first fluid supply tube being insertable into the first cell port to fluidly connect said filling pod with the first cell and the second fluid supply tube being insertable into the second cell port to fluidly connect said filling pod with the second cell.

7. The filling pod as set forth in claim 1 wherein the filling pod housing further defines a second filling pod port through which fluid flows from said filling pod, wherein the channel includes a third channel portion in fluid communication between the first-mentioned filling pod port and the second filling pod port, and wherein, when fluid is supplied to said filling pod through the first-mentioned filling pod port, any excess amount of fluid flows from the second filling pod port and from said filling pod.

8. The filling pod as set forth in claim 7 wherein the channel fluidly connects the first-mentioned filling pod port, the first fluid supply member, the second fluid supply member and the second filling pod port in series.

9. The filling pod as set forth in claim 7 wherein the first channel portion extends between the first-mentioned filling pod port and the first fluid supply member, wherein the second channel member extends between the first fluid supply member and the second fluid supply member and fluidly connects the first-mentioned filling pod port to the second fluid supply member, and wherein the third channel portion extends between the second fluid supply member and the second filling pod port and fluidly connects the first-mentioned filling pod port to the second filling pod port.

10. The filling pod as set forth in claim 7 wherein the channel fluidly connects the first-mentioned filling pod port, the first fluid supply member, the second fluid supply member and the second filling pod port such that, when fluid is supplied through the first-mentioned filling pod port, the first amount of fluid flows through the first fluid supply member and to the first cell before the second amount of fluid flows to the second fluid supply member and to the second cell, and such that the second amount of fluid flows through the second fluid supply member and to the second cell before any excess amount of fluid flows through the second filling pod port and from said filling pod.

11. The filling pod as set forth in claim 7 wherein the second filling pod port is fluidly connected to the fluid source to supply any excess amount of fluid from said filling pod to the fluid source.

12. The filling pod as set forth in claim 7 wherein the first-mentioned filling pod port and the second filling pod port are alternatively and selectively fluidly connectable with the fluid source to receive fluid from the fluid source.

13. The filling pod as set forth in claim 12 wherein the first-mentioned filling pod port is fluidly connected with the fluid source so that fluid is supplied through the first-mentioned filling pod port to the first fluid supply member and to the second fluid supply member and so that any excess amount of fluid flows from the second filling pod port and from said filling pod.

14. The filling pod as set forth in claim 13 wherein the first-mentioned filling pod port is disconnected from the fluid source and the second filling pod port is fluidly connected with the fluid source so that fluid is supplied through the second filling pod port to the first fluid supply member and to the second fluid supply member and so that any excess amount of fluid flows from the first-mentioned filling pod port and from said filling pod.

15. The filling pod as set forth in claim 1 and further comprising a locking arrangement for locking said filling pod to the battery.

16. The filling pod as set forth in claim 15 wherein the battery further includes a battery locking member, and wherein the locking arrangement includes a filling pod locking member engageable with the battery locking member to lock said filling pod to the battery.

17. The filling pod as set forth in claim 16 wherein the battery further includes a battery housing having a cover portion, the cover portion defining a first cell port communicating with the first cell and through which fluid is supplied to the first cell, wherein the battery locking member is supported adjacent the first cell port, and wherein the filling pod locking member is supported adjacent the first fluid supply member.

18. The filling pod as set forth in claim 1 wherein the filling pod housing includes
 a first wall positionable adjacent the battery,
 a second wall spaced from the first wall, and
 a side wall extending between the first wall and the second wall and defining a periphery of the filling pod housing, and
 wherein the filling pod port includes a first end fluidly connectable to the fluid source and a second end communicating with the channel, the first end being positioned within the periphery of the filling pod housing.

19. The filling pod as set forth in claim 18 wherein the side wall defines a recessed portion extending inwardly from the periphery of the filling pod housing, and wherein the filling pod port is positioned in the recessed portion.

20. The filling pod as set forth in claim 18 wherein the filling pod housing defines a second filling pod port in fluid communication with the channel and through which fluid flows from said filling pod, the second filling pod port including a first end communicating with the channel and a second end through which fluid flows from said filling pod, the second end of the second filling pod port being positioned within the periphery of the filling pod housing.

21. The filling pod as set forth in claim 20 wherein the side wall defines a first recessed portion and a second recessed portion each extending inwardly from the periphery of the filling pod housing, and wherein the first-mentioned filling pod port is positioned in the first recessed portion and the second filling pod port is positioned in the second recessed portion.

22. The filling pod as set forth in claim 1 wherein the filling pod housing further defines
 a first vent passage fluidly connected with the channel and fluidly connectable with the first cell, the first vent passage providing a flow path for gas from the first cell, and
 a second vent passage fluidly connected with the channel and fluidly connectable with the second cell, the second vent passage providing a flow path for gas from the second cell.

23. The filling pod as set forth in claim 22 wherein the filling pod housing further defines a relief chamber for collecting gas,
a first relief passage fluidly connectable between the first vent passage and the relief chamber, and
a second relief passage fluidly connectable between the second vent passage and the relief chamber.

24. The filling pod as set forth in claim 23 and further comprising:
 a first valve regulating flow of gas through the first relief passage, the first valve having an open position, in which gas flows from the first cell to the relief chamber, and a closed position, in which gas flow from the first cell to the relief chamber is prevented; and
 a second valve regulating flow of gas through the second relief passage, the second valve having an open position, in which gas flows from the second cell to the relief chamber, and a closed position, in which gas flow from the second cell to the relief chamber is prevented.

25. The filling pod as set forth in claim 24 wherein the first valve and the second valve move from the closed position to the open position when there is excess pressure in the first relief passage and the second relief passage, respectively.

26. The filling pod as set forth in claim 1 wherein the battery further includes a battery housing, and wherein the filling pod housing is connectable with the battery housing.

27. The filling pod as set forth in claim 26 wherein the filling pod housing is removably connectable with the battery housing.

28. A combination for supplying fluid to a battery, said combination comprising:
 a battery including
  a first cell including an electrode submergible in the fluid,
  a second cell including an electrode submergible in the fluid; and
 a filling pod for supplying the fluid to the battery, the filling pod including a filling pod housing defining
  a filling pod port fluidly connectable to a fluid source for receiving fluid from the fluid source,
  a first fluid supply member fluidly connectable to the first cell and for supplying fluid from the filling pod port and to the first cell,
  a second fluid supply member fluidly connectable to the second cell and for supplying fluid from the filling pod port and to the second cell, and
  an integral channel in fluid communication between the filling pod port, the first fluid supply member, and the second fluid supply member, the channel including a first channel portion in fluid communication between the filling pod port and the first fluid supply member and a second channel portion in fluid communication between the filling pod port and the second fluid supply member, wherein, when fluid is supplied to the filling pod through the filling pod port, a first amount of fluid flows through the first channel portion to the first fluid supply member and to the first cell, and a second amount of fluid flows through the second channel portion to the second fluid supply member and to the second cell.

29. The combination as set forth in claim 28 wherein the channel fluidly connects the filling pod port, the first fluid supply member and the second fluid supply member in series.

30. The combination as set forth in claim 28 wherein the first channel portion extends between the filling pod port and the first fluid supply member, and wherein the second channel member extends between the first fluid supply member and the second fluid supply member and fluidly connects the filling pod port to the second fluid supply member.

31. The combination as set forth in claim 28 wherein the channel fluidly connects the filling pod port, the first fluid supply member and the second fluid supply member such that, when fluid is supplied through the filling pod port, the first amount of fluid flows through the first fluid supply member and to the first cell before the second amount of fluid flows to the second fluid supply member and to the second cell.

32. The combination as set forth in claim 28 wherein the battery further includes a battery housing having a cover portion substantially enclosing the first cell and the second cell, the cover portion defining a first cell port and second cell port communicating with the first cell and the second cell, respectively, and through which fluid is suppliable to the cell, and wherein the first fluid supply member is connectable with the first cell port to supply fluid through the first cell port and to the first cell, and the second fluid supply member is connectable with the second cell port to supply fluid through the second cell port and to the second cell.

33. The combination as set forth in claim 32 wherein the filling pod housing includes a first fluid supply tube and a second fluid supply tube providing the first fluid supply member and the second fluid supply member, respectively, the first fluid supply tube being insertable into the first cell port to fluidly connect the filling pod with the first cell and the second fluid supply tube being insertable into the second cell port to fluidly connect the filling pod with the second cell.

34. The combination as set forth in claim 33 wherein the battery further includes a battery locking member supported adjacent the first cell port, and wherein the filling pod further includes a filling pod locking member supported on the first fluid supply tube, the battery locking member and the filling pod locking member being engaged when the first fluid supply tube is inserted into the first cell port to lock the filling pod to the battery.

35. The combination as set forth in claim 34 wherein the battery locking member and the filling pod locking member are engageable to releasably lock the filling pod to the battery.

36. The combination as set forth in claim 33 wherein the battery further includes a first battery locking member supported adjacent the first cell port and a second battery locking member supported adjacent the second cell port, wherein the filling pod further includes a first filling pod locking member supported on the first fluid supply tube and a second filling pod locking member supported on the second fluid supply tube, the first battery locking member engaging the first filling pod locking member and the second battery locking member engaging the second filling pod locking member to lock the filling pod to the battery.

37. The combination as set forth in claim 28 wherein the filling pod housing further defines a second filling pod port through which fluid flows from the filling pod, wherein the channel includes a third channel portion in fluid communication between the first-mentioned filling pod port and the second filling pod port, and wherein, when fluid is supplied to the filling pod through the first-mentioned filling pod port, any excess amount of fluid flows from the second filling pod port and from the filling pod.

38. The combination as set forth in claim 37 wherein the channel fluidly connects the first-mentioned filling pod port, the first fluid supply member, the second fluid supply member and the second filling pod port in series.

39. The combination as set forth in claim 37 wherein the first channel portion extends between the first-mentioned filling pod port and the first fluid supply member, wherein the second channel member extends between the first fluid supply member and the second fluid supply member and fluidly connects the first-mentioned filling pod port to the second fluid supply member, and wherein the third channel portion extends between the second fluid supply member and the second filling pod port and fluidly connects the first-mentioned filling pod port to the second filling pod port.

40. The combination as set forth in claim 37 wherein the channel fluidly connects the first-mentioned filling pod port, the first fluid supply member, the second fluid supply member and the second filling pod port such that, when fluid is supplied through the filling pod port, the first amount of fluid flows through the first fluid supply member and to the first cell before the second amount of fluid flows to the second fluid supply member and to the second cell, and such that the second amount of fluid flows through the second fluid supply member and to the second cell before any excess amount of fluid flows through the second filling pod port and from the filling pod.

41. The combination as set forth in claim 37 wherein the second filling pod port is fluidly connected to the fluid source to supply any excess amount of fluid from the filling pod to the fluid source.

42. The combination as set forth in claim 37 wherein the first-mentioned filling pod port and the second filling pod port are alternatively and selectively fluidly connectable with the fluid source to receive fluid from the fluid source.

43. The combination as set forth in claim 28 and further comprising a locking arrangement for locking the filling pod to the battery.

44. The combination as set forth in claim 43 wherein the locking arrangement includes a battery locking member supported on the battery and a filling pod locking member supported on the filling pod and engageable with the battery locking member to lock the filling pod to the battery.

45. The combination as set forth in claim 44 wherein the battery further includes a battery housing having a cover portion, the cover portion defining a first cell port communicating with the first cell and through which fluid is supplied to the first cell, wherein the battery locking member is supported adjacent the first cell port, and wherein the filling pod locking member is supported adjacent the first fluid supply member.

46. The combination as set forth in claim 28 wherein the filling pod housing includes
  a first wall positionable adjacent the battery,
  a second wall spaced from the first wall, and
  a side wall extending between the first wall and the second wall and defining a periphery of the filling pod housing,
  wherein the first-mentioned filling pod port includes a first end fluidly connectable to the fluid source and a second end communicating with the channel, the first end of the first-mentioned filling pod port being positioned within the periphery of the filling pod housing, and
  wherein the filling pod housing defines a second filling pod port in fluid communication with the channel and through which fluid flows from the filling pod housing, the second port including a first end communicating with the channel and a second end through which fluid flows from said filling pod, the second end of the second filling pod port being positioned within the periphery of the filling pod housing.

47. The combination as set forth in claim 46 wherein the side wall defines a first recessed portion and a second recessed portion each extending inwardly from the periphery of the filling pod housing, and wherein the first-mentioned filling pod port is positioned in the first recessed portion and the second filling pod port is positioned in the second recessed portion.

48. The combination as set forth in claim 28 wherein the battery further includes a battery housing, and wherein the filling pod is connectable to the battery housing.

49. The combination as set forth in claim 48 wherein the filling pod is releasably connectable to the battery housing.

50. The combination as set forth in claim 28 wherein the filling pod housing further defines
   a relief chamber for collecting gas,
   a first vent passage fluidly connected with the channel and fluidly connectable with the first cell and providing a flow path for gas from the first cell,
   a first relief passage fluidly connectable between the first vent passage and the relief chamber,
   a first valve regulating flow of gas through the first relief passage, the first valve having an open position, in which gas flows from the first cell to the relief chamber, and a closed position, in which gas flow from the first cell to the relief chamber is prevented,
   a second vent passage fluidly connected with the channel and fluidly connectable with the second cell and providing a flow path for gas from the second cell,
   a second relief passage fluidly connectable between the second vent passage and the relief chamber, and
   a second valve regulating flow of gas through the second relief passage the second valve having an open position, in which gas flows from the second cell to the relief chamber, and a closed position, in which gas flow from the second cell to the relief chamber is prevented.

51. A vehicle comprising:
   a frame supported for movement over ground;
   a motor supported by the frame and for powering said vehicle;
   a battery supported by the frame and electrically connectable with the motor to supply power to the motor, the battery including
      a first cell including an electrode submergible in a fluid, and
      a second cell including an electrode submergible in the fluid; and
   a filling pod for supplying fluid to the battery, the filling pod including a filling pod housing defining
      a filling pod port fluidly connectable to a fluid source for receiving fluid from the fluid source,
      a first fluid supply member fluidly connectable to the first cell and for supplying fluid from the filling pod port and to the first cell,
      a second fluid supply member fluidly connectable to the second cell and for supplying fluid from the filling pod port and to the second cell, and
      an integral channel in fluid communication between the filling pod port, the first fluid supply member, and the second fluid supply member, the channel including a first channel portion in fluid communication between the filling pod port and the first fluid supply member and a second channel portion in fluid communication between the filling pod port and the second fluid supply member, wherein, when fluid is supplied to the filling pod through the first filling pod port, a first amount of fluid flows through the first channel portion to the first fluid supply member and to the first cell, and a second amount of fluid flows through the second channel portion to the second fluid supply member and to the second cell.

52. The vehicle as set forth in claim 51 wherein the filling pod housing further defines a second filling pod port, and wherein the second filling pod port is connectable to the fluid source so that any excess fluid flows from the filling pod and back to the fluid source.

53. The vehicle as set forth in claim 51 wherein the filling pod housing further defines a second filling pod port, and wherein the second filling pod port is not connectable to the fluid source.

54. The vehicle as set forth in claim 51 and further comprising a conduit connectable between the filling pod port and the fluid source, the conduit including a quick-connect assembly selectively connecting the filling pod port to the fluid source so that fluid is supplied from the fluid source to the filling pod.

55. The vehicle as set forth in claim 51 and further comprising:
   a second battery supported by the frame and electrically connectable to the motor to supply power to the motor, the second battery including
      a first cell including an electrode submergible in a fluid, and
      a second cell including an electrode submergible in the fluid; and
   a second filling pod for supplying fluid to the second battery, the second filling pod including a second filling pod housing defining
      a filling pod port fluidly connectable to a fluid source for receiving fluid from the fluid source,
      a first fluid supply member fluidly connectable to the first cell of the second battery and for supplying fluid from the second filling pod port and to the first cell of the second battery,
      a second fluid supply member fluidly connectable to the second cell of the second battery and for supplying fluid from the second filling pod port and to the second cell of the second battery, and
      an integral channel in fluid communication between the filling pod port, the first fluid supply member, and the second fluid supply member, the channel including a first channel portion in fluid communication between the filling pod port and the first fluid supply member and a second channel portion in fluid communication between the filling pod port and the second fluid supply member, wherein, when fluid is supplied to the second filling pod through the first filling pod port, a first amount of fluid flows through the first channel portion to the first fluid supply member and to the first cell of the second battery, and a second amount of fluid flows through the second channel portion to the second fluid supply member and to the second cell of the second battery.

56. The vehicle as set forth in claim 55 wherein the first-mentioned filling pod and the second filling pod are connected in series.

57. The vehicle as set forth in claim 55 wherein the first-mentioned filling pod housing further defines a second filling pod port through which fluid flows from the first-mentioned filling pod, wherein the channel of the first-mentioned filling pod includes a third channel portion in fluid communication between the first-mentioned filling pod port and the second filling pod port, wherein, when fluid is supplied to the first-mentioned filling pod through the first-mentioned filling pod port, any excess amount of fluid flows from the second filling pod port and the first-mentioned filling pod, wherein the second filling pod housing further defines a second filling pod port through which fluid flows from the second filling pod, wherein the channel of the second filling pod includes a third channel portion in fluid communication between the first-mentioned filling pod port and the second filling pod port, wherein, when fluid is supplied to the second filling pod through the first-mentioned filling pod port, any excess amount of fluid flows from the second filling pod port and the second filling pod.

58. The vehicle as set forth in claim 57 wherein the second filling pod port of the first-mentioned filling pod is fluidly connected to the first-mentioned filling pod port of the second filling pod so that any excess amount of fluid flows from the first-mentioned filling pod to the second filling pod.

59. The vehicle as set forth in claim 55 wherein the first-mentioned filling pod and the second filling pod are connected in parallel.

60. The vehicle as set forth in claim 55 wherein one of the first-mentioned filling pod housing and the second filling pod housing defines a second filling pod port, wherein the second filling pod port is connectable to the source so that any excess fluid flows back to the source.

61. The vehicle as set forth in claim 55 wherein one of the first-mentioned filling pod housing and the second filling pod housing defines a second filling pod port, wherein the second filling pod port is not connectable to the source.

62. The vehicle as set forth in claim 51 wherein the fluid source is supported on the frame.

63. A filling pod for supplying fluid to a battery, the battery including a first cell and a second cell, each cell including at least one electrode submergible in the fluid, said filling pod comprising:
   a filling pod housing attachable to the battery and having
      a filling pod port fluidly connectable to a fluid source for receiving fluid from the fluid source,
      a first fluid supply member fluidly connectable to the first cell,
      a second fluid supply member fluidly connectable to the second cell, and
      an integral channel in fluid communication between the filling pod port, the first fluid supply member, and the second fluid supply member, the channel including a first channel portion in fluid communication between the filling pod port and the first fluid supply member and a second channel portion in fluid communication between the filling pod port and the second fluid supply member, wherein, when fluid is supplied to said filling pod through the filling pod port, a first amount of fluid flows through the first channel portion to the first fluid supply member and to the first cell, and a second amount of fluid flows through the second channel portion to the second fluid supply member and to the second cell.

64. The filling pod as set forth in claim 63 wherein the channel fluidly connects the filling pod port, the first fluid supply member and the second fluid supply member in series.

65. A filling device for supplying fluid to a first battery cell and to a second battery cell of a battery, each cell including at least one electrode submergible in the fluid, said filling device comprising:
   a filling device housing having
      a filling device port fluidly connectable to a fluid source for receiving fluid from the fluid source,
      a first fluid supply member fluidly connectable to the first cell,
      a second fluid supply member fluidly connectable to the second cell, and
      an integral channel in fluid communication between and connecting the filling device port, the first fluid supply member, and the second fluid supply member in series, the channel including a first channel portion in fluid communication between the filling device port and the first fluid supply member and a second channel portion in fluid communication between the filling device port and the second fluid supply member, wherein, when fluid is supplied to said filling device through the filling device port, a first amount of fluid flows through the first channel portion to the first fluid supply member and to the first cell, and a second amount of fluid flows through the second channel portion to the second fluid supply member and to the second cell.

66. The filling device as set forth in claim 65 wherein the battery also includes a battery housing supporting the first battery cell and the second battery cell, and wherein said filling device is a filling pod attachable to the battery housing.

67. The filling device as set forth in claim 66 wherein the battery housing includes a cover portion substantially enclosing the first battery cell and the second battery cell, and wherein the filling pod is attachable to the cover portion.

68. A combination for supplying fluid to a battery, said combination comprising:
   a battery including
      a battery housing including a battery cover portion,
      a first cell supported by the battery housing and including an electrode submergible in the fluid,
      a second cell supported by the battery housing and including an electrode submergible in the fluid; and
   a filling pod for supplying the fluid to the battery, the filling pod including a filling pod housing defining
      a filling pod port fluidly connectable to a fluid source for receiving fluid from the fluid source,
      a first fluid supply member fluidly connectable to the first cell and for supplying fluid from the filling pod port and to the first cell,
      a second fluid supply member fluidly connectable to the second cell and for supplying fluid from the filling pod port and to the second cell, and
      an integral channel in fluid communication between the filling pod port, the first fluid supply member, and the second fluid supply member, the channel including a first channel portion in fluid communication between the filling pod port and the first fluid supply member and a second channel portion in fluid communication between the filling pod port and the second fluid supply member, wherein, when fluid is supplied to the filling pod through the filling pod port, a first amount of fluid flows through the first channel portion to the first fluid supply member and to the first cell, and a second amount of fluid flows through the second channel portion to the second fluid supply member and to the second cell,
   the filling pod housing including
      a base portion having a bottom surface engageable with the battery cover portion, the base portion defining the integral channel,
      an intermediate portion connectable with the base portion and defining the filling pod port,
      a top portion connectable with the intermediate portion, and
      a first fluid supply tube and a second fluid supply tube providing at least a portion of the first fluid supply member and the second fluid supply member, the first fluid supply tube and the second fluid supply tube being connectable with the base portion.

69. The combination as set forth in claim 68 wherein the base portion is fixed to the battery cover portion.

70. The combination as set forth in claim 69 wherein the base portion is removably fixed to the battery cover portion.

71. The combination as set forth in claim 68 wherein the base portion is integrally formed with the battery cover portion.

72. The combination as set forth in claim 71 wherein the intermediate portion, the top portion, the first fluid supply tube and the second fluid supply tube are connected with the base portion.

73. A method of supplying fluid to a battery, the battery including a first cell and a second cell, each cell including at least one electrode submergible in the fluid, said method comprising the acts of:

providing a filling pod for supplying fluid to the battery, the filling pod including a filling pod housing defining a filling pod port fluidly connectable to a fluid source for receiving fluid from the fluid source, a first fluid supply member fluidly connectable to the first cell and for supplying fluid from the filling pod port and to the first cell, a second fluid supply member fluidly connectable to the second cell and for supplying fluid from the filling pod port and to the second cell, and an integral channel in fluid communication between the filling pod port, the first fluid supply member, and the second fluid supply member, the channel including a first channel portion in fluid communication between the filling pod port and the first fluid supply member and a second channel portion in fluid communication between the filling pod port and the second fluid supply member;

fluidly connecting the filling pod to the battery including fluidly connecting the first fluid supply member to the first cell and fluidly connecting the second fluid supply member to the second cell;

fluidly connecting the filling pod port to the fluid source; and supplying fluid from the fluid source to the battery through the filling pod including supplying a first amount of fluid through the first channel portion to the first fluid supply member and to the first cell and supplying a second amount of fluid through the second channel portion to the second fluid supply member and to the second cell.

74. The method as set forth in claim 73 wherein, in said supplying act, the act of supplying a first amount of fluid occurs before the act of supplying a second amount of fluid.

75. The method as set forth in claim 73 wherein the battery further includes a battery housing having a cover portion substantially enclosing the first cell and the second cell, the cover portion defining a first cell port and a second cell port communicating with the first cell and the second cell, respectively, and through which fluid is suppliable to the cell, wherein the filling pod further includes a first fluid supply tube and a second fluid supply tube providing the first fluid supply member and the second fluid supply member, respectively, and wherein said act of fluidly connecting the filling pod to the battery includes inserting the first fluid supply tube into the first cell port to fluidly connect the filling pod with the first cell and inserting the second fluid supply tube into the second cell port to fluidly connect the filling pod with the second cell.

76. The method as set forth in claim 73 wherein the filling pod housing further defines a second filling pod port through which fluid flows from the filling pod, wherein the channel includes a third channel portion in fluid communication between the first-mentioned filling pod port and the second filling pod port, and wherein said method further comprises the act of supplying any excess amount of fluid through the second filling pod port and from the filling pod.

77. The method as set forth in claim 76 wherein the channel fluidly connects the first-mentioned filling pod port, the first fluid supply member, the second fluid supply member and the second filling pod port such that said act of supplying any excess amount of fluid through the second filling pod port occurs after the act of supplying a first amount of fluid and after the act of supplying a second amount of fluid.

78. The method as set forth in claim 77 wherein, in said supplying act, the act of supplying a first amount of fluid occurs before the act of supplying a second amount of fluid.

79. The method as set forth in claim 73 and further comprising the act of locking the filling pod to the battery.

80. The method as set forth in claim 79 wherein the locking act includes releasably locking the filling pod to the battery.

81. The method as set forth in claim 79 wherein the battery includes a battery locking member and the filling pod includes a filling pod locking member, and wherein the locking act includes engaging the battery locking member with the filling pod locking member to lock the filling pod to the battery.

* * * * *